(12) United States Patent
Ogasawara

(10) Patent No.: US 6,594,221 B2
(45) Date of Patent: Jul. 15, 2003

(54) OPTICAL PICKUP DEVICE

(75) Inventor: Masakazu Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 33 days.

(21) Appl. No.: 09/953,453

(22) Filed: Sep. 17, 2001

(65) Prior Publication Data

US 2002/0071360 A1 Jun. 13, 2002

(30) Foreign Application Priority Data

Sep. 29, 2000 (JP) ........................................ 2000-298224

(51) Int. Cl.[7] .................................................. G11B 7/00
(52) U.S. Cl. ............................... 369/112.19; 369/44.23; 369/44.37; 369/44.42; 369/112.21; 369/112.28; 369/112.12
(58) Field of Search ........................... 369/44.23, 44.37, 369/44.41, 44.42, 112.18, 112.19, 112.21, 112.28, 112.12, 112.15

(56) References Cited

U.S. PATENT DOCUMENTS

| | | | |
|---|---|---|---|
| 5,783,818 A | * | 7/1998 | Manabe et al. .............. 250/239 |
| 5,841,745 A | * | 11/1998 | Kuhn et al. ............... 369/44.23 |
| 5,978,344 A | * | 11/1999 | Horinouchi et al. ......... 369/112 |
| 5,982,733 A | * | 11/1999 | Yanagawa et al. ........... 369/112 |

FOREIGN PATENT DOCUMENTS

JP     08-055363     2/1996

* cited by examiner

Primary Examiner—Doris H. To
Assistant Examiner—Gautam R. Patel
(74) Attorney, Agent, or Firm—Morgan, Lewis & Bockius LLP

(57) ABSTRACT

An optical pickup device includes an illuminating optical system for focusing light beams, split in a main beam and at least one side beam, onto a track on an information storage surface of an optical storage medium to form optical spots thereon. The device also includes a light detecting optical system for introducing return light reflected back from the information storage surface and a polarizing optical element. The polarizing optical element has regions split at the center of an optical path by a parting line extending at least either in a direction of extension of the track or in a direction perpendicular to the direction of extension. The polarizing optical element also splits the main beam return light at least in two for each of the regions on a plane perpendicular to the optical path of the return light of the reflected main beam in the light detecting optical system. The polarizing optical element is disposed where the return light of the main and side beams is spatially separated. The optical pickup device further includes an optical detector disposed in contact with the polarizing optical element. The optical detector has a plurality of main-beam light-receiving elements for receiving the separated main beam return light and a plurality of side-beam light-receiving elements for receiving the separated side beam return light.

12 Claims, 26 Drawing Sheets

OPTICAL SPOTS FOCUSED ON DISK

OPTICAL SPOTS FOCUSED SHORT OF DISK

OPTICAL SPOTS FOCUSED BEYOND DISK

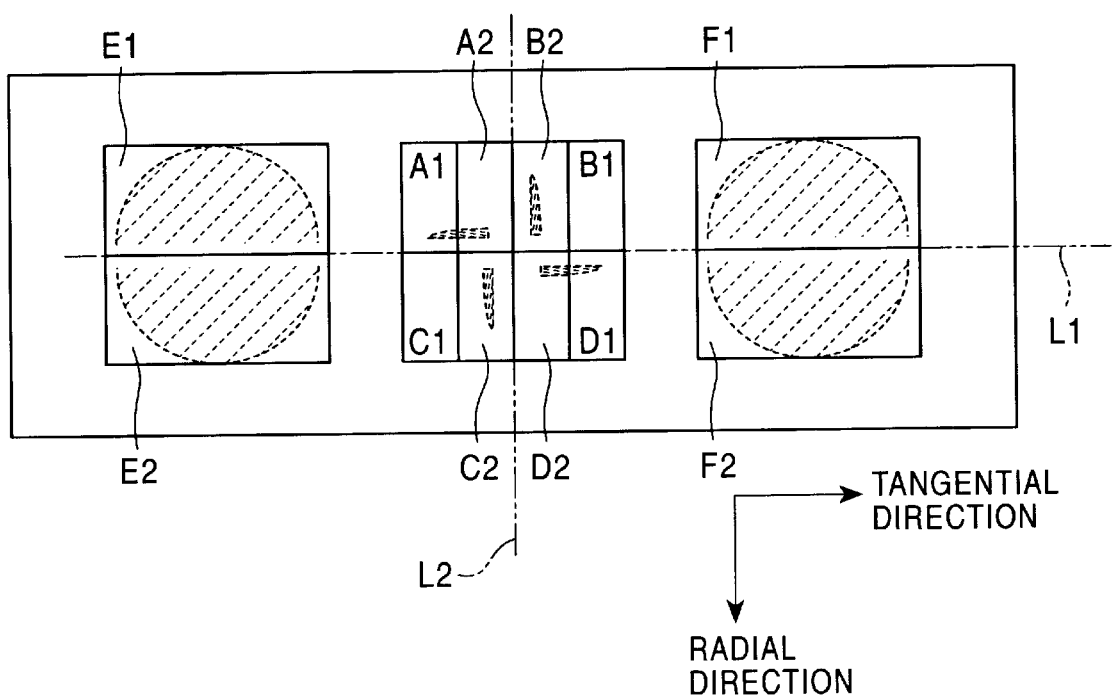

OPTICAL PICKUP DEVICE

BACKGROUND OF THE INVENTION

1. Field of the Invention

The present invention relates to an optical pickup device for emitting a beam of light to read information from a storage medium.

2. Description of the Related Art

An optical pickup device is adapted to operate under the focusing servo control and the tracking servo control to accurately read information stored on the tracks of an optical storage medium such as an optical disk. The focusing servo control is adapted to move an objective lens back and forth relative to the storage surface of the storage medium such that a beam of light for illuminating the storage medium is focused on the storage surface. On the other hand, the tracking servo control is adapted to translate the objective lens in a direction perpendicular to the tangential direction of the track such that the beam of light is positioned on the track of the storage surface.

The focusing servo control generates a focus error signal indicative of the degree of focus error in accordance with the level of received light reflected from the storage medium and allows a focusing actuator to drive the objective lens back and forth in order to reduce the focus error signal.

The tracking servo control generates a tracking error signal indicative of the degree of tracking error in accordance with the level of received light reflected from the storage medium and allows a tracking actuator to drive the objective lens in the radial direction of the optical disk in order to reduce the focus error signal.

For example, the methods for generating the focus error signal in the focusing servo control include the so-called spot size method or astigmatism method, while the methods for generating the tracking error signal in the tracking servo control include a so-called three-beam method.

In the spot size method and the three-beam method, a diffraction grating, a hologram or the like is employed to split a single beam of light into one diffracted beam of 0th order and two diffracted beams of +/- first order. Of these beams of light, the beam of 0th order is called the main beam, while the beams of +1st and -1st order are called the side beams.

It has been generally practiced to obtain the focus error signal by the main beam in an optical pickup device that employs a plurality of beams of light as well as in an optical pickup device employing the three-beam method. That is, the side beams other than the main beam are subjected substantially in vain to optical action or would rather have a harmful effect such as crosstalk between optical beam signals on a light-receiving element of an optical detector (hereinafter referred to as the detector). For example, in a generally organized differential size spot method, a hologram element is placed at a portion where the three beams are not separately available, thereby making two light beams having different focal lengths available. The three-beam method provides for a total of 6 light beams (=3×2). This causes the number of optical beam spots to increase on the detector, whereby an additional number of subdivisions (light-receiving elements) are required of the detector corresponding to the increase.

For example, such an optical pickup device has been suggested which employs the three-beam method as disclosed in Japanese Patent Laid-Open Publication No. Hei 8-55363.

As shown in FIG. 1, the optical pickup device disclosed therein includes a module which is integrated with a laser detector and has a hologram element formed of parallel flat plates. A divergent beam 63b emitted from a semiconductor laser 1b is reflected upon a mirror 82 and incident on the hologram element. The hologram element is provided with a hologram 17 and an annular grating 83. The light beam incident on the hologram element passes through the annular grating 83 and is then split into three beams of 0th and +/- 1st orders, whereby the main and side beams for tracking are generated.

The three beams pass through the hologram 17 and then an objective lens (not shown) to converge each as an optical spot on an optical disk (not shown).

Each optical spot reflected and diffracted on the optical disk passes again through the objective lens to be then incident on the hologram element as a return light beam. Each of the return light beams incident on the hologram element passes through the hologram 17 to be then split into three beams. This yields six beams in total, or diffracted beams of +/- 1st orders are received by an optical detector 13b and converted into electrical signals. Then, the electrical signals delivered by the optical detector 13b is operated as desired, thereby making it possible to provide a focus error signal, a tracking error signal, and a written information signal.

In the prior art disclosed in Japanese Patent Laid-Open Publication No. Hei 8-55363, the hologram 17 is placed before where the main and side beams of the return light are split physically and spatially. Accordingly, the optical pickup device is optically designed such that, of the nine beams obtained by splitting the main and side beams of the return light, specific diffracted beams are made available. In this prior art, the three-beam method also provides six optical beam spots in total, resulting in an increase in number of the subdivisions of the detector. The optical design of the hologram 17 is also made complicated.

The optical pickup device cannot be made large for use with a storage medium read device such as an optical disk player. It is therefore desired to make compact the portions related to the focusing servo control and the tracking servo control.

OBJECT AND SUMMARY OF THE INVENTION

In view of the aforementioned problems, an object of the present invention is to provide a compact optical pickup device which can accomplish the focusing servo control and the tracking servo control with stability.

The optical pickup device according to the present invention includes an illuminating optical system for focusing a light beam, split in a main beam and at least one side beam, onto a track on an information storage surface of an optical storage medium to form optical spots thereon. The device also includes a light detecting optical system for introducing return light reflected back from the information storage surface, and a polarizing optical element. The polarizing optical element has regions split at the center of an optical path by a parting line extending at least either in a direction of extension of the track or in a direction perpendicular to the direction of extension. The polarizing optical element also splits the main beam return light at least in two for each of the regions on a plane perpendicular to the optical path of the return light of the reflected main beam in the light detecting optical system. The polarizing optical element is disposed where the return light of the main and side beams is spatially separated. The optical pickup device further includes an optical detector disposed in contact with the polarizing optical element. The optical detector has a plurality of main-beam light-receiving elements for receiving the separated main beam return light and a plurality of side-beam light-receiving elements for receiving the separated side beam return light.

In one aspect of the optical pickup device according to the present invention, said polarizing optical element comprises a parallel plate portion formed of an optically transparent material, and a split reflecting surface, formed on a side of light emission of said parallel plate portion, for reflecting return light in said split regions, and said main and side beam light-receiving elements are formed on the side of light emission of said parallel plate portion, and two or more main-beam light-receiving elements are disposed to allow said separated main beam return light to be reflected at a boundary surface on a side of light incidence of said parallel plate portion to reach said main-beam light-receiving element.

In another aspect of the optical pickup device according to the present invention, said split reflecting surface is a pyramidal prism recessed surface having a ridge line corresponding to said parting line.

In a further aspect of the optical pickup device according to the present invention, said split reflecting surface is a roof type prism recessed surface having a ridge beam line corresponding to said one parting line and a step portion along said other parting line.

In a still further aspect of the optical pickup device according to the present invention, said split reflecting surface is a hologram for reflecting light in different directions in said split regions.

In another aspect of the optical pickup device according to the present invention, said split reflecting surface is provided with a semitransparent film.

In a further aspect of the present invention, the optical pickup device further comprises:

a three-way-split detector, disposed opposite to said split reflecting surface, having three light-receiving regions split by two parallel parting lines extending in a direction perpendicular to the direction of extension of said track, wherein each of said main-beam light-receiving elements comprises two light-receiving regions split by two-way-splitting parting lines extending generally in parallel to a direction perpendicular to the direction of extension of said track, said two-way-splitting parting line extends to where signals delivered by said two light-receiving regions derived from said return light spot when a light beam is focused on an optical storage medium are generally equal to each other, and a differential spot size method is employed to generate a focus error signal in accordance with an output of said three-way-split detector and said main-beam light-receiving elements, said focus error signal consists of the sum of differences between signals delivered from the two light-receiving regions of said main-beam light-receiving elements and the sum of differences between outputs from a light-receiving region sandwiched by two light-receiving regions of said three-way-split detector and from the sandwiching two light-receiving regions.

In a still further aspect of the optical pickup device according to the present invention, tracking servo control is provided by a phase difference method for detecting a phase difference in each sum signal delivered from said main-beam light-receiving elements for receiving independently said return light having passed through said split regions.

In another aspect of the optical pickup device according to the present invention, said hologram splits said return light in two or more for each of said regions and has an optical function for providing said return light passing through said regions adjacent to each other on the same side split by said parting line with astigmatisms rotated by 90 degrees relative to each other around the optical path, each of said main-beam light-receiving elements comprises two light-receiving regions split by two-way-splitting parting lines extending generally in parallel to said parting line disposed in a direction perpendicular to the direction of extension of said track, said two-way-splitting parting line extends to where signals delivered by said two light-receiving regions of said light-receiving elements derived from said return light spot received on said light-receiving elements on an image plane where a light beam becomes circular in an optical system provided with astigmatism are generally equal to each other, and a focus error signal is generated from the sum of differences between signals delivered from the two light-receiving regions of said light-receiving elements.

In a further aspect of the optical pickup device according to the present invention, said polarizing optical element comprises a parallel plate portion formed of an optically transparent material, and a four-way-splitting hologram, formed on a side of light incidence of said parallel plate portion, for splitting in four and transmitting return light in said split regions, said main and side beam light-receiving elements are formed on the side of light emission of said parallel plate portion, and four of said main-beam light-receiving elements for receiving the return light of said split main beam are disposed apart from each other in said split regions, said hologram splits said return light in four for each of said regions and has an optical function for providing said return light passing through said regions adjacent to each other on the same side split by said parting line with astigmatisms rotated by 90 degrees relative to each other around the optical path, each of said main-beam light-receiving elements comprises two light-receiving regions split by two-way-splitting parting lines extending generally in parallel to said parting line disposed in a direction perpendicular to the direction of extension of said track, when a light beam becomes circular in an optical system provided with astigmatism, said two-way-splitting parting line extends to where signals delivered by said two light-receiving regions of each of said main beam light-receiving elements derived from said return light spot received on said main beam light-receiving elements are generally equal to each other, and a focus error signal is generated from the sum of differences between signals delivered from the two light-receiving regions of each of said main beam light-receiving elements.

In a still further aspect of the optical pickup device according to the present invention, said polarizing optical element comprises a two-way-splitting hologram, formed on the side of light incidence of said parallel plate portion, for splitting in two and transmitting return light of said side beam for each of said split regions split in two along a parting line extending in the direction of extension of said track.

In another aspect of the optical pickup device according to the present invention, each of said side-beam light-receiving elements comprises two light-receiving regions spaced apart from each other and split in two along a parting line extending in the direction of extension of said track, and tracking servo control is provided by a differential push-pull method in accordance with a sum signal of differences between signals delivered from the two light-receiving regions of each of said side-beam light-receiving elements.

BRIEF DESCRIPTION OF THE DRAWINGS

FIGS. 25 to 27 are plan views illustrating the arrangement of a photo-detector in an optical pickup device according to another embodiment of the present invention.

DETAILED DESCRIPTION OF THE PREFERRED EMBODIMENTS

Now, the present invention will be explained below in more detail with reference to the accompanying drawings in accordance with the embodiments.

[Optical Pickup]

Figure 1:
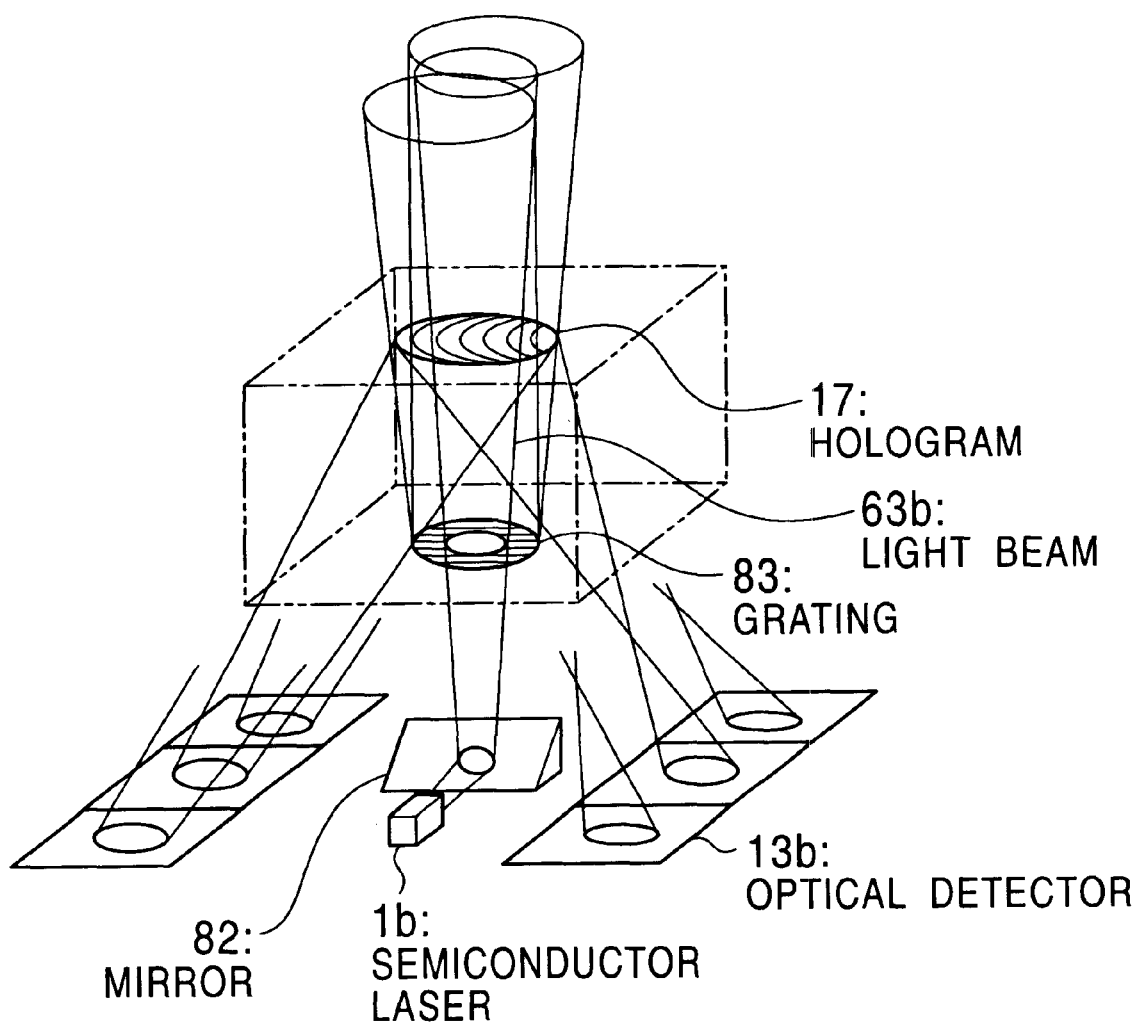
FIG. 1 is a schematic perspective view illustrating the configuration of a prior-art optical pickup device.
Figure 2:
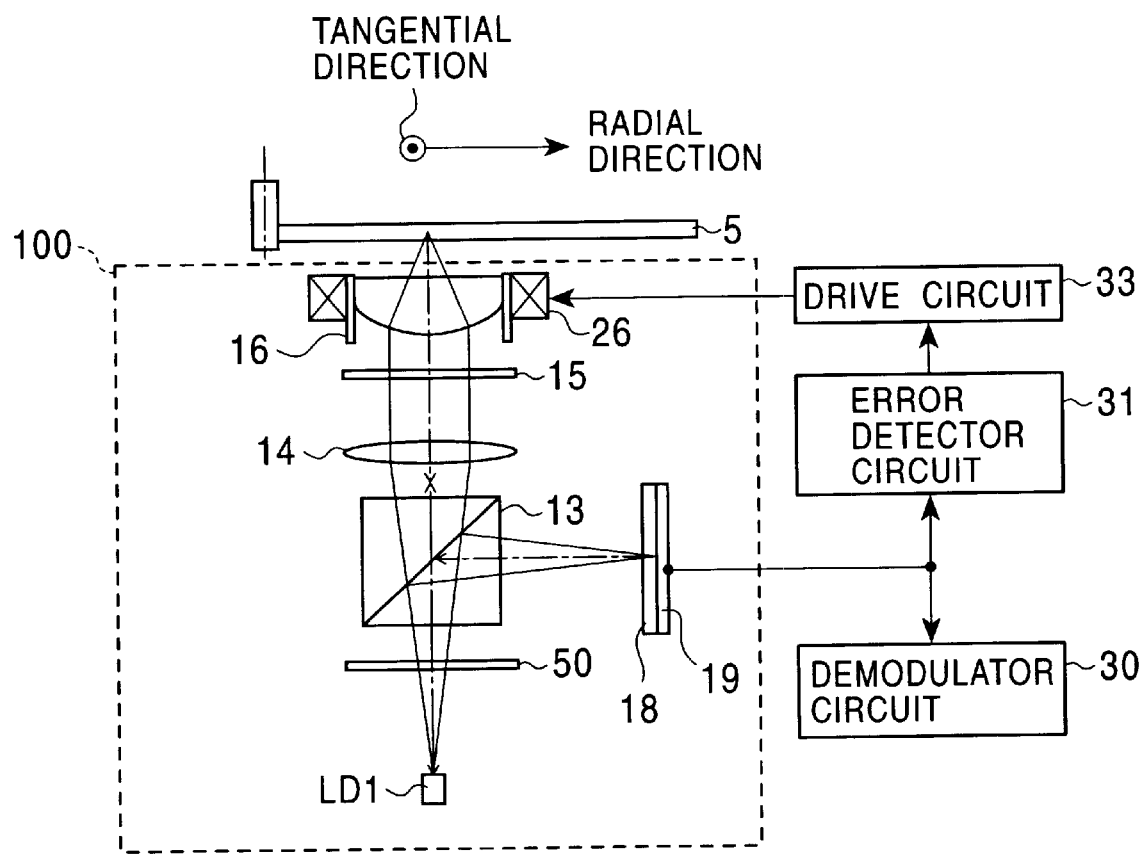
FIG. 2 is a schematic cross-sectional view illustrating an optical pickup device according to an embodiment of the present invention.

FIG. 2 is a schematic view illustrating an optical read/write device incorporating an optical pickup device according to an embodiment of the present invention. For example, an optical pickup device 100 includes a semiconductor laser LD1 for emitting blue light having short wavelengths ranging from 400 nm to 410 nm. The optical pickup device 100 also includes an illuminating optical system which includes a diffraction grating 50 with stripes spaced at regular intervals, a polarizing beam splitter 13, a collimator lens 14, a quarter wave plate 15, and an objective lens unit 16. The illuminating optical system allows a laser beam emitted from the semiconductor laser LD1 to pass through the diffraction grating 50 and the polarizing beam splitter 13. Then, the collimator lens 14 collimates the laser beam, which is then transmitted from the quarter wave plate 15 and passes through the objective lens unit 16 to converge towards an optical disk 5 placed near the focal point thereof. Thus, the laser beam forms three optical spots (not shown) on an array of pits provided on the information storage surface of the optical disk 5. The diffracting effect of the diffraction grating 50 serves to split the single light beam launched from the semiconductor laser LD1 into beams of 0th and +/− 1st order, that is, one main beam and two side beams available on both sides of the main beam.

In addition to the illuminating optical system, the optical pickup device 100 further includes a detecting optical system, which also makes use of the objective lens unit 16, the quarter wave plate 15, and the polarizing beam splitter 13. The return light beam reflected from the optical disk 5 is incident on the objective lens unit 16 and then passes through the quarter wave plate 15. Then, the polarizing beam splitter 13 directs the beam in a direction different from that towards the semiconductor laser LD1 and then allows the beam to impinge upon an optical detector 19 through a polarizing optical element 18. The polarizing optical element 18 and the optical detector 19 are disposed on a plane perpendicular to the optical path (optical axis) of an optical system for detecting the return light of a reflected main beam. Suppose that the polarizing optical element 18 does not exert an optical effect on the return light. In this case, at least three optical spots (not shown), or the main and side beams, are formed on the light-receiving elements of the optical detector 19. However, in practice, three or more optical spots are formed thereon since the polarizing optical element 18 exerts an optical effect at least on the return light of the main beam and thereby splits the return light. The optical detector 19, disposed in contact with the polarizing optical element 18, includes a plurality of main-beam light-receiving elements for receiving the return light of the main beam incident perpendicularly thereon and a plurality of side-beam light-receiving elements for receiving the return light of the side beams.

Each of the light-receiving elements of the optical detector 19 is connected to a demodulator circuit 30 and an error detector circuit 31. The error detector circuit 31 is connected to a drive circuit 33 for driving a mechanism which includes an actuator 26 to be used for the objective lens unit to operate under the tracking servo control and the focusing servo control.

The optical detector 19 supplies an electrical signal to the demodulator circuit 30 and the error detector circuit 31 in accordance with an optical spot image formed on the light-receiving element (detector). The demodulator circuit 30 then generates a write signal in accordance with the electrical signal. The error detector circuit 31 generates a focus error signal, a tracking error signal, and other servo signals in accordance with the electrical signal, and then supplies each drive signal to each actuator through the drive circuit 33 of the actuator. The actuators provide servo control drive for the objective lens unit 16 or the like in accordance with each drive signal. The focusing servo control according to the first embodiment employs the selective differential spot size method to use the main beam to generate the focus error signal, while the tracking servo control employs the phase difference method and differential push-pull method to generate the tracking error signal.

[Optical Detector and Polarizing Optical Element with a Pyramidal Prism]

Now, described below in detail is the structure of the polarizing optical element 18 and the optical detector 19 of the detecting optical system.

Figure 3:
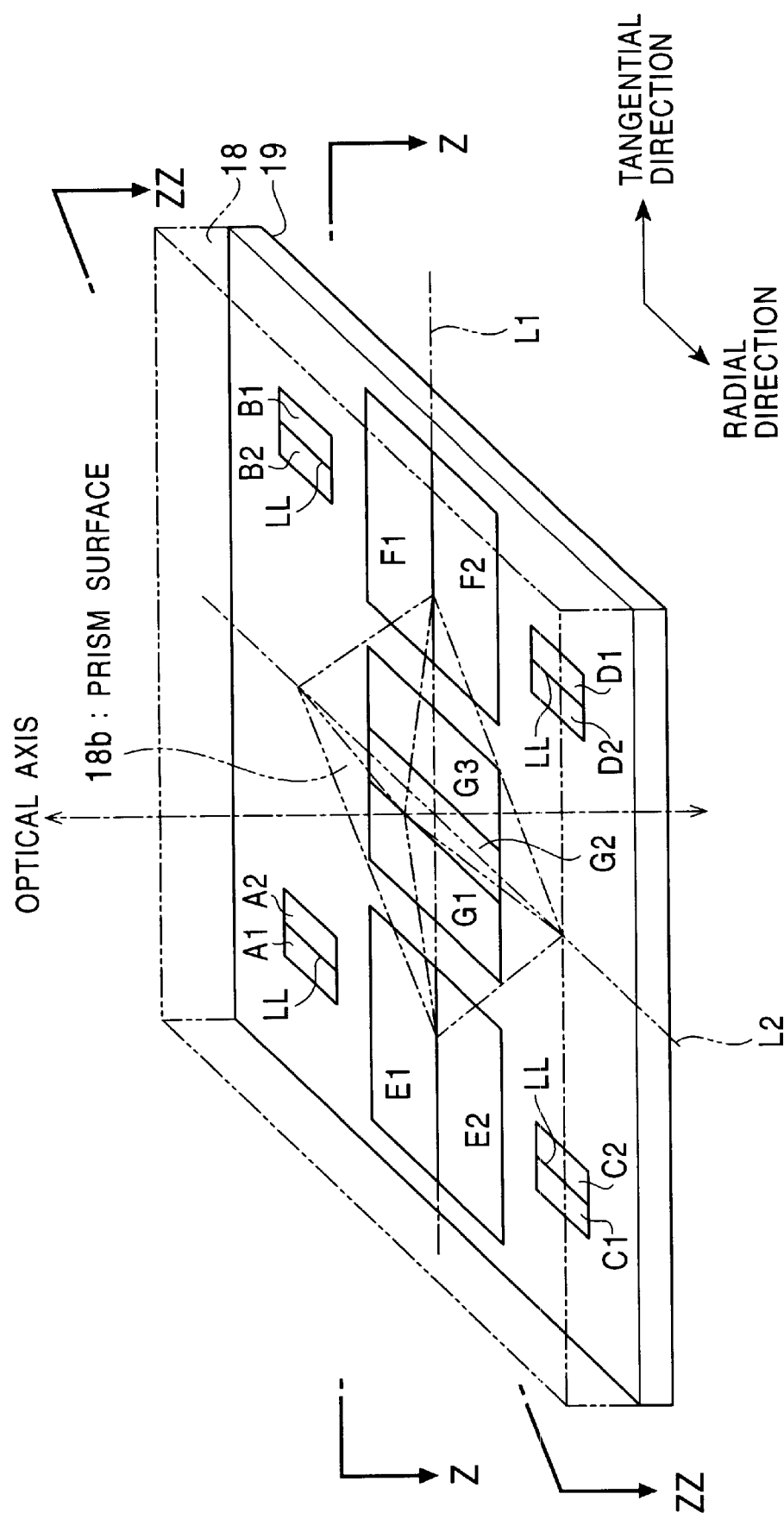
FIG. 3 is a schematic perspective view illustrating an assembly of an optical polarizing element and an optical detector in an optical pickup device according to an embodiment of the present invention.
Figure 4:
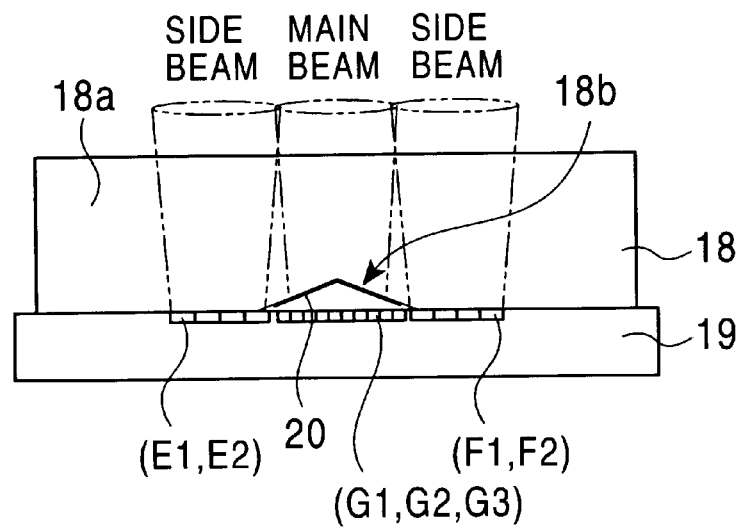
FIG. 4 is a sectional view taken along line ZZ–ZZ of FIG. 3.

As shown in FIG. 3, the polarizing optical element 18 is formed as a whole of an optically transparent parallel plate and bonded onto a plurality of detectors (light-receiving elements) of the optical detector 19. In addition, as shown in FIG. 4, the polarizing optical element 18 is disposed where the return light of the main and side beams is spatially split. Each detector of the optical detector 19 is also disposed where the return light of the main and side beams is spatially split. The polarizing optical element 18 includes a parallel plate portion 18a formed of an optically transparent material and a pyramidal prism recessed surface 18b. The pyramidal prism recessed surface 18b is formed on the side of light emission of the parallel plate portion (on the side of bonding of the optical detector 19) and has the top generally aligned with the optical axis of the main beam.

The pyramidal prism recessed surface 18b is formed of four planes or a four-way-split reflecting surface. The four-way-split reflecting surface has the first to fourth quadrant regions which are split in four at the center of the optical path along two parting lines L1, L2 each extending in parallel to the direction of extension of the track (in the tangential direction) and in the direction perpendicular to the tangential direction (in the radial direction). Each of the quadrant regions reflects part of the return light of the main beam. That is, the pyramidal prism recessed surface 18b, having ridges corresponding to the parting lines L1, L2, allows the return light of the main beam to be split in four at each of the first to fourth quadrant regions inside the polarizing optical element 18, for example, at an angle of 45 degrees to the parting lines L1, L2.

The pyramidal prism recessed surface 18b, which is provided with a semi-transmissive film 20, splits the main beam return light in four on the four-way-split surface as reflected light as well as transmitted light.

There is provided a gap between the pyramidal prism recessed surface 18b and the optical detector 19. The recessed gap may be filled with an optically transparent material lower in refractivity than that of the parallel plate portion.

As shown in FIG. 3, on the surface of the optical detector 19, there are provided the main-beam light-receiving elements (A1, A2), (B1, B2), (C1, C2), (D1, D2) in the first to fourth quadrants. Also provided are a three-way-split detector (G1, G2, G3) at the center and the side-beam light-receiving elements (E1, E2), (F1, F2) adjacent the parting line L1. The surface is bonded to the parallel plate portion on the side of the pyramidal prism recessed surface 18b of the polarizing optical element 18.

The three-way-split detector includes three light-receiving regions (G1, G2, G3) which are disposed opposite to the pyramidal prism recessed surface 18b and split by two parallel parting lines that extend corresponding to the direction perpendicular to the direction of extension of the track.

Each of the side-beam light-receiving elements includes two light-receiving regions (E1, E1), (F1, F2), which are split in two and spaced apart from each other along the parting line extending in the direction of extension of the track. The differential push-pull method is employed to provide the tracking servo control for the objective lens in accordance with the sum signal of differences between the signals delivered from each of the two side-beam light-receiving regions. The side-beam light-receiving elements and the main-beam light-receiving elements are formed in the same plane.

Figure 5:
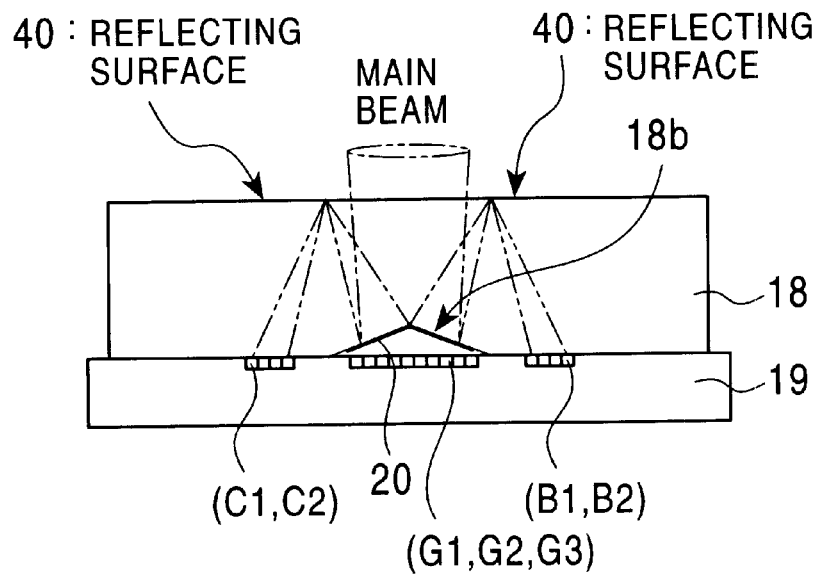
FIG. 5 is a sectional view taken along line Z–Z of FIG. 3.

In addition, as shown in FIGS. 3 to 5, the main-beam light-receiving elements (A1, A2), (B1, B2), (C1, C2), (D1, D2) are placed in the first to fourth quadrant regions which are split in the direction of the track and in an intersecting direction perpendicular thereto. This arrangement is intended to allow each return light of the main beam, split in four by the pyramidal prism recessed surface 18b, to be reflected at the interface on the side of light incidence of the parallel plate portion 18a and then travel to each of the light-receiving elements. It is also possible to deposit a metal film by evaporation partially on such an interface on the side of light incidence or a reflecting surface 40.

Each of the main-beam light-receiving elements includes two light-receiving regions (A1, A2), (B1, B2), (C1, C2), (D1, D2) split by two-way-splitting lines LL which extend generally in parallel to the radial direction of the disk. The two-way-splitting line LL of the main-beam light-receiving element is extendedly set where two signals delivered from two light-receiving regions of the main-beam light-receiving element are generally equal to each other. The signals are derived from the spots of the return light received on the main-beam light-receiving elements, each spot having the shape of a quarter-circle sector and provided upon focusing the laser beam on the storage surface of the optical disk. The spot size method employs the difference in output provided by the spots of those sizes in the light-receiving regions.

Now, described in detail below is the operation of the polarizing optical element 18 and the optical detector 19 incorporated in the detecting optical system.

The first embodiment employs the differential spot size method which makes use of optical spots of light beams derived from a main beam that is split by the polarizing optical element 18 with pyramidal prism surfaces.

As shown in FIGS. 3 and 4, the pyramidal prism surface is disposed to exert an effect only on the return light of the main beam. Accordingly, the return light of the side beams is incident on each of the light-receiving regions (E1, E2, F1, F2) of the side-beam light-receiving element without being subjected to the effect of reflection provided by the pyramidal prism surfaces. The main beam is separated into reflected light which is split in four by the pyramidal prism recessed surface 18b and transmitted light which is transmitted to impinge upon the main-beam light-receiving elements disposed immediately under the prism. The reflected light is reflected on the reflecting surface 40 provided on the side of light incidence of the polarizing optical element and then impinges upon the light-receiving regions (A1, A2), (B1, B2), (C1, C2), (D1, D2) of the main-beam light-receiving elements. As shown in FIG. 5, when viewed along the optical path, the main beam three-way-split detector (G1, G2, G3) is disposed before the focal point f of the return light from the disk when the objective lens is at the focal position. On the other hand, the light-receiving regions (A1, A2), (B1, B2), (C1, C2), (D1, D2) of the main-beam light-receiving elements are disposed after the focal position. Since each of the light-receiving regions is split in two so that the spot size can be measured, it is possible to obtain the focus error signal by the differential spot size method.

The focusing servo control allows the selective differential spot size method, which makes use of the three-way-split detector for the main beam and the output from the main-beam light-receiving elements, to generate the focus error signal. The focus error signal is indicative of the sum total of the sum of the differences between the signals delivered from the two light-receiving regions (A1, A2), (B1, B2), (C1, C2), (D1, D2) of the main-beam light-receiving elements. The sum total also includes the difference between the output from the light-receiving region (G2) sandwiched by two light-receiving regions (G1, G3) of the three-way-split detector and the total output delivered from the two light-receiving regions that sandwich the region (G2). In other words, using the reference symbols of the light-receiving elements of the optical detector 19 as their outputs, the focus error signal FES is expressed by the following equation (1). That is, $$FES=(G1+G3-G2)+(A1+B1+C2+D1-A2-B2-C2-D2) \quad (1)$$

Figure 6:
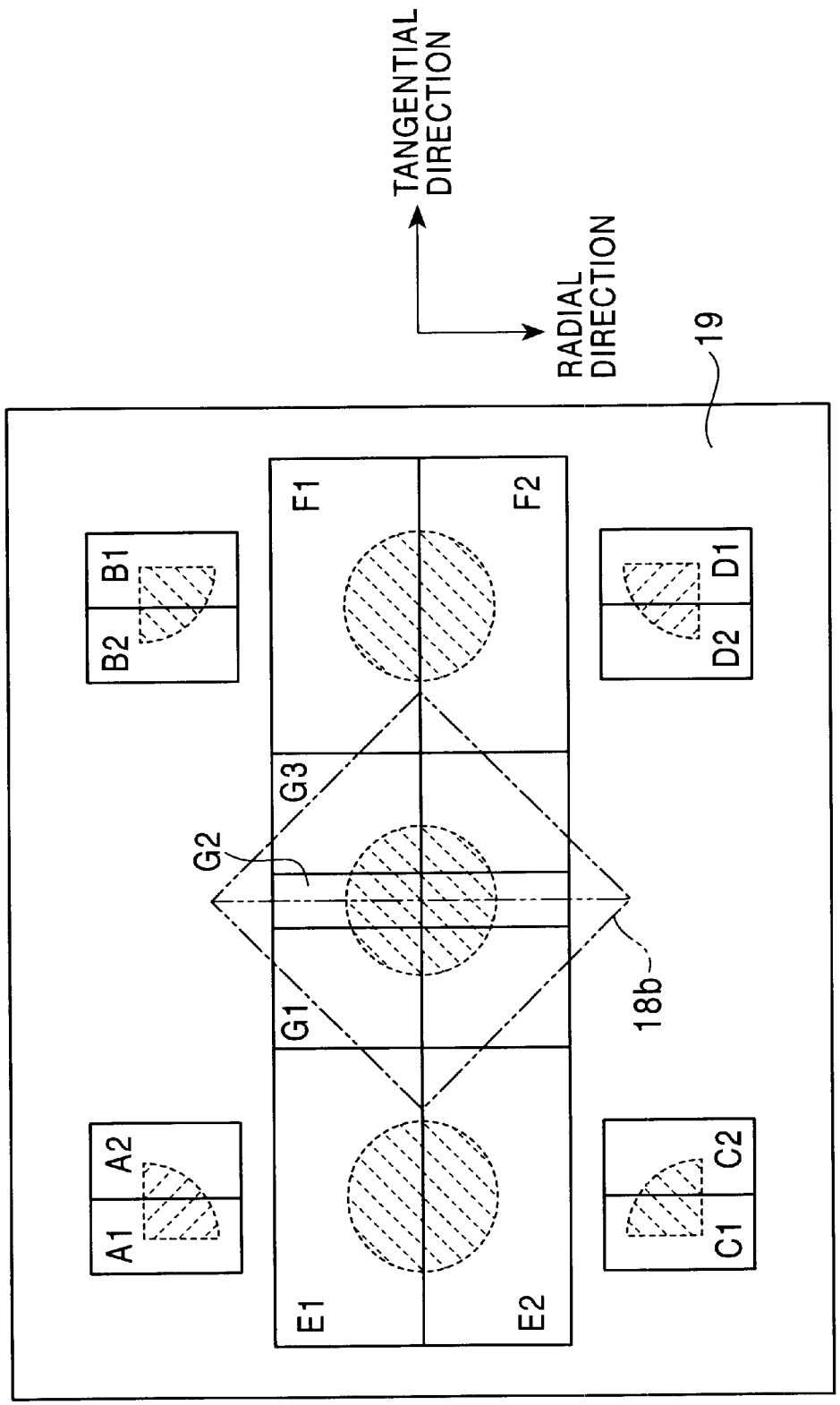
FIGS. 6 to 8 are plan views illustrating the arrangement of a photo-detector in an optical pickup device according to an embodiment of the present invention.
Figure 7:
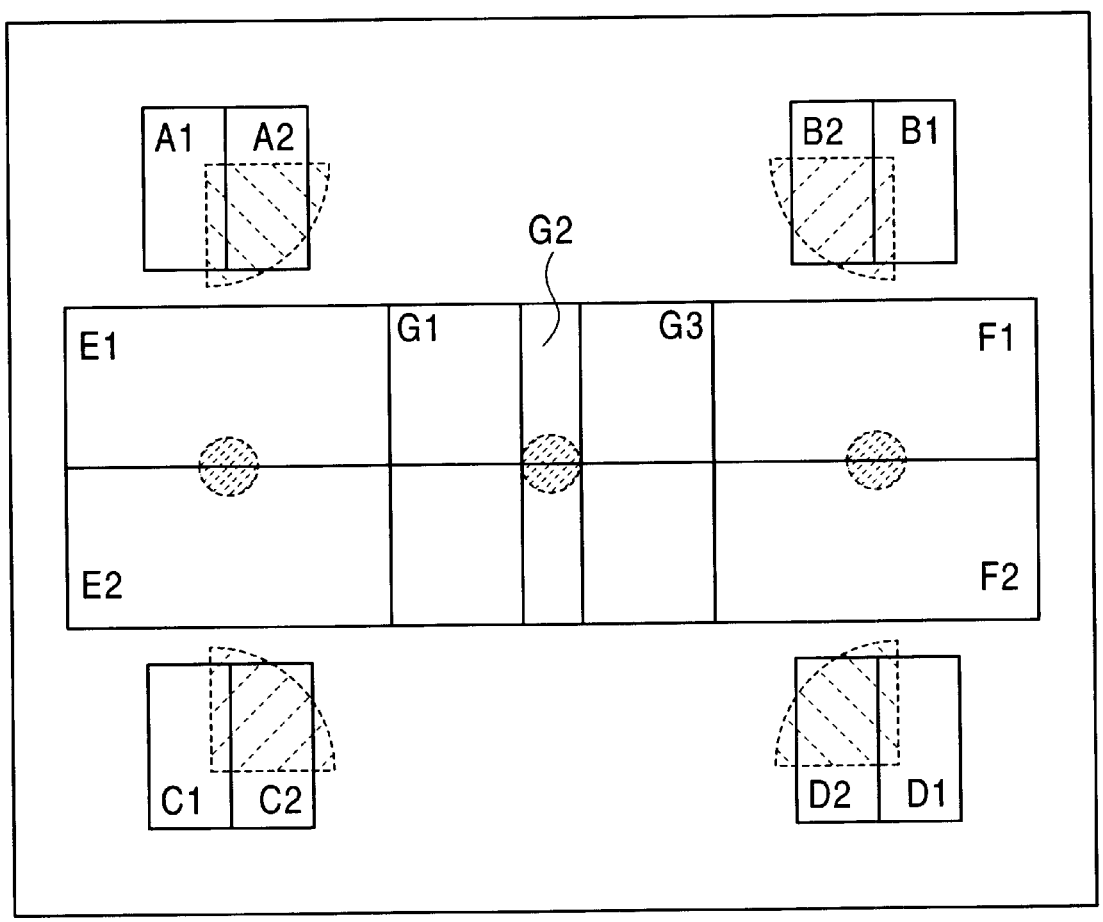
Figure 8:
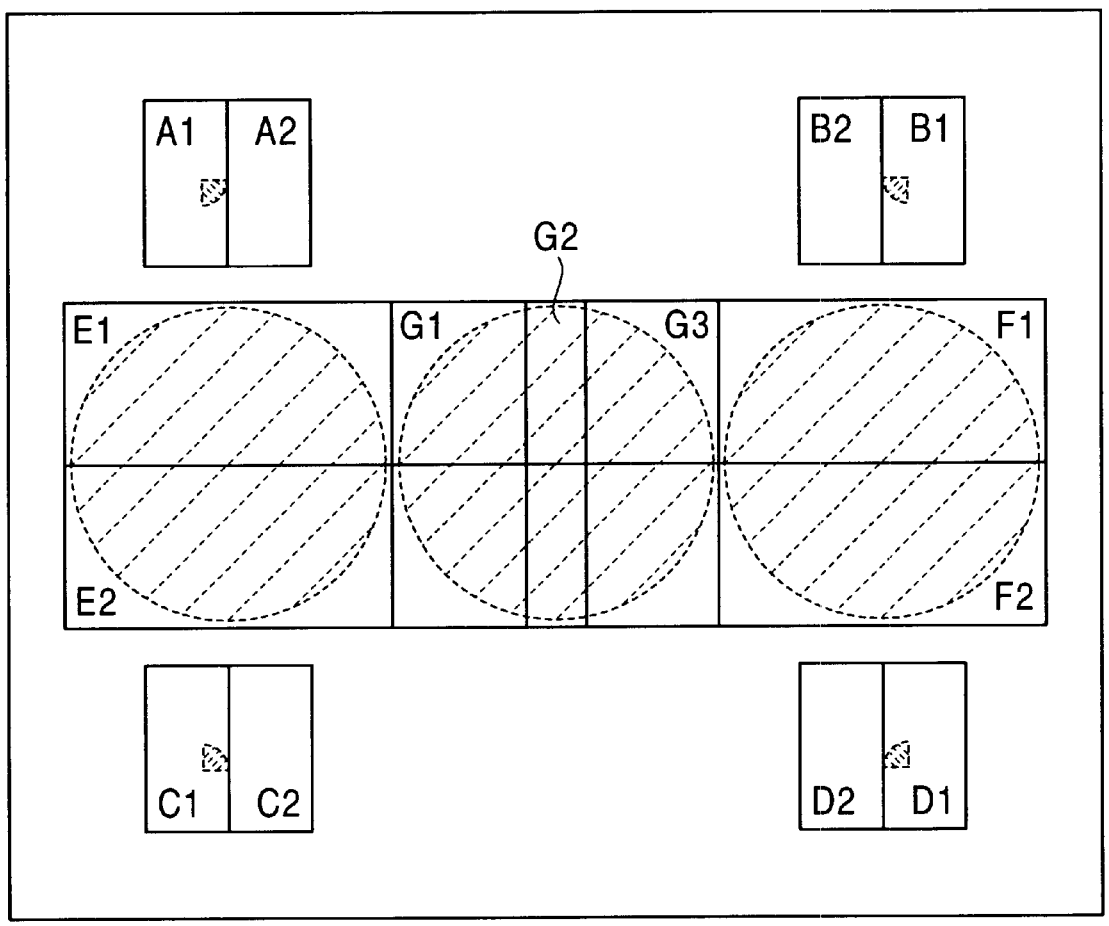

Reference is now made to FIGS. 6 to 8 to explain the action of the optical detector 19 provided when the focal point of the objective lens is varied in the optical pickup device 100.

FIG. 6 is a view illustrating the state of the optical spot of return light on each of the light-receiving elements when the light beam from the optical pickup is focused on an information storage surface of the optical disk. With the spots being focused, the return light is split and incident on each quadrant region of the main-beam light-receiving elements (A1, A2), (B1, B2), (C1, C2), (D1, D2) of the optical detector 19. At this time, each of the split return light is incident across the parting line as a quarter-circle optical spot having the same shape and area, or a sector-shaped optical spot. The three-way-split detector (G1, G2, G3) and the side-beam light-receiving elements (E1, E2), (F1, F2), arranged in the direction of the track, receive the transmitted return light having the same circular optical spot. Therefore, with the spots being focused, the FES becomes zero from the aforementioned equation (1) since the light detecting electrical signals delivered from any pair of light-receiving regions are equal to each other.

FIG. 7 is a view illustrating the state of the optical spot of return light when the light beam from the optical pickup is out of focus on an information storage surface of the optical disk, and the optical disk is placed farther away from the focal point of the objective lens. With the optical disk being placed farther away from the focal point of the objective lens, the split sector-shaped optical spots of the return light expand to diverge each in the direction of L1, thereby causing the area to increase on the side of the light-receiving regions (A2), (B2), (C2), (D2). At the same time, the circular optical spots at the center decrease in area to be less in area from the light-receiving regions (G1, G3) of the three-way-split detector towards the regions (G2). Therefore, with the optical disk being placed farther away from the focal point of the objective lens, the FES takes generally on a negative value from the aforementioned equation (1).

FIG. 8 is a view illustrating the state of a return light spot when the optical disk is defocused being placed closer to the objective lens than to the focal point thereof. Thus, the figure shows the state of the return light spots on the light-receiving elements (A1, A2), (B1, B2), (C1, C2), (D1, D2) in the first to fourth quadrant regions. With the optical disk being placed closer to the objective lens than to the focal point thereof, the split sector-shaped optical spots of the return light are decreased in area, each spot being extended in the direction of L1 to be less in area towards light-receiving regions (A1), (B1), (C1), (D1). At the same time, the circular optical spots at the center increase in area to be larger in area from the light-receiving region (G2) of the three-way-split detector towards (G1, G3). Therefore, with the optical disk being placed closer to the objective lens than to the focal point thereof, the FES takes generally on a positive value from the aforementioned equation (1).

As described above, the FES expressed by the aforementioned equation (1) makes it possible to determine as follows. That is, the optical disk is placed at the focal position when the FES is zero, farther away from the focal position when the FES has a positive value, and closer to the objective lens than to the focal point thereof when the FES has a negative value. Accordingly, the focusing servo control can be positively provided by means of electrical feedback signals with an inverted positive or negative sign of the focus error signal FES and through the control of an objective lens drive mechanism provided on an objective lens 7 of the optical pickup device 100 to make the value of FES zero.

Incidentally, in the optical pickup device 100, the value of sub-signals SubRF1, SubRF2 and the main read signal MainRF, which are expressed by the following equations (2) to (4), may be operated using the output of the aforementioned light-receiving elements. These RF signals make it possible to read information stored on the optical disk.

$$SbuRF1=E1+E2 \quad (2)$$

$$SbuRF2=F1+F2 \quad (3)$$

$$MainRF=A1+A2+B1+B2+C1+C2+D1+D2+G1+G2+G3 \quad (4)$$

On the other hand, the pyramidal prism recessed surface 18b has the function of splitting the main beam in four across the first to fourth quadrant regions that are split in the direction of the track and in an orthogonal direction that intersects the track. This function makes it possible to obtain a tracking error DPD (Differential Phase Detection) signal for use in the differential phase detection method. The three-way-split detector (G1, G2, G3) immediately below the prism can be further split to obtain the DPD signal. However, this would lead to an increased number of subdivisions of the detector and thus only the main-beam light-receiving elements (A1, A2), (B1, B2), (C1, C2), (D1, D2) may be preferably used.

Each of the sum signals which are delivered from the main-beam light-receiving elements and represented by DPD1, DPD2, DPD3, DPD4 of the following equations (5) to (8) can be used to obtain the tracking error signal by operating the sum signals with a comparator to be used for comparison of phase.

$$DPD1=A1+A2 \quad (5)$$

$$DPD2 = B1 + B2 \tag{6}$$

$$DPD3 = C1 + C2 \tag{7}$$

$$DPD4 = D1 + D2 \tag{8}$$

This embodiment also makes it possible to obtain a push-pull signal for use in the differential push-pull method (DPP). In this case, it is possible to operate the differential push-pull signal DPP shown by the following equation (9). That is, $$DPP = (E1 + F1 - E2 - F2) + (A1 + A2 + B1 + B2 - C1 - C2 - D1 - D2) \tag{9}$$

Figure 9:
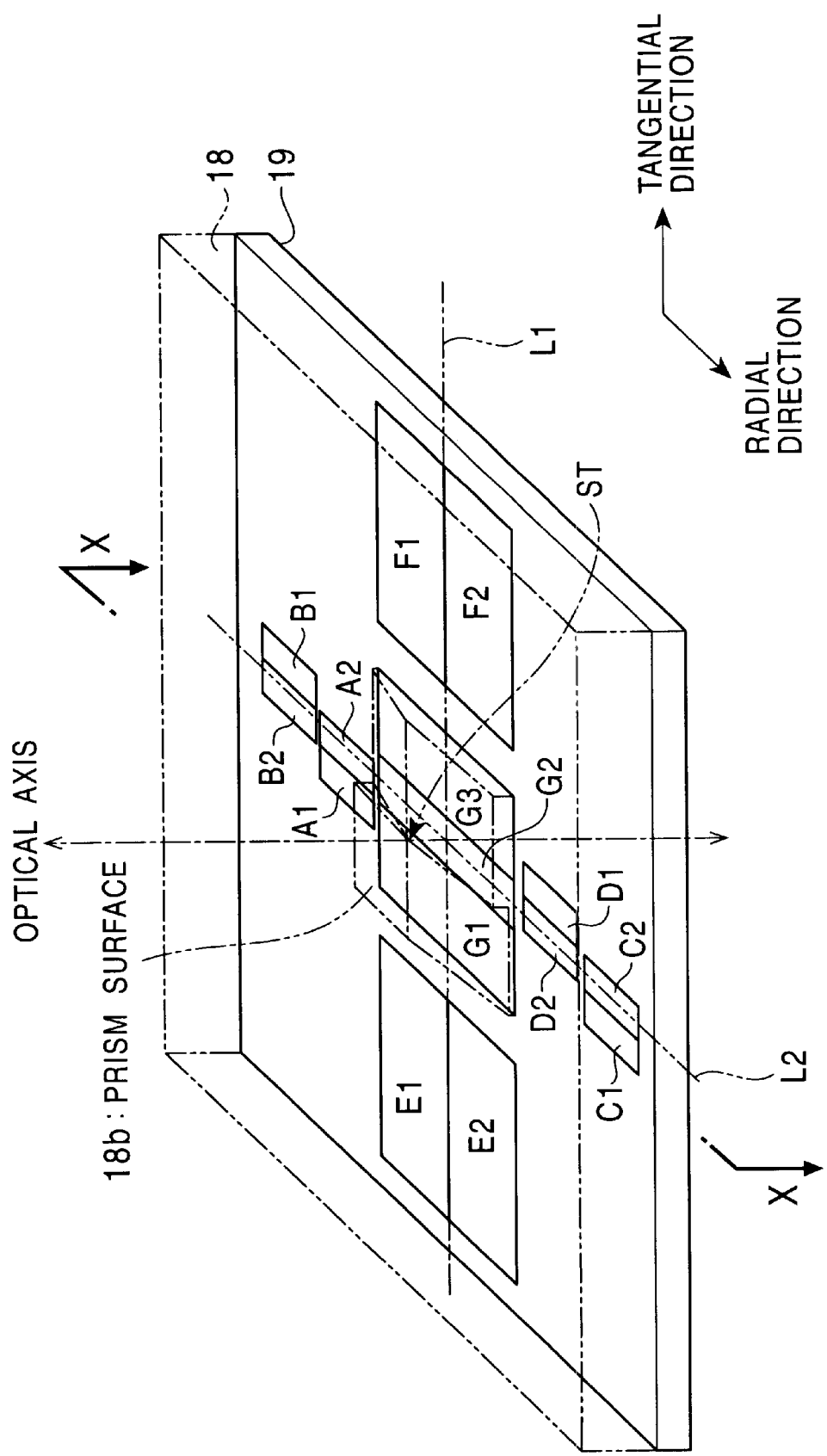
FIG. 9 is a schematic perspective view illustrating an assembly of an optical polarizing element and an optical detector in an optical pickup device according to another embodiment of the present invention.
Figure 10:
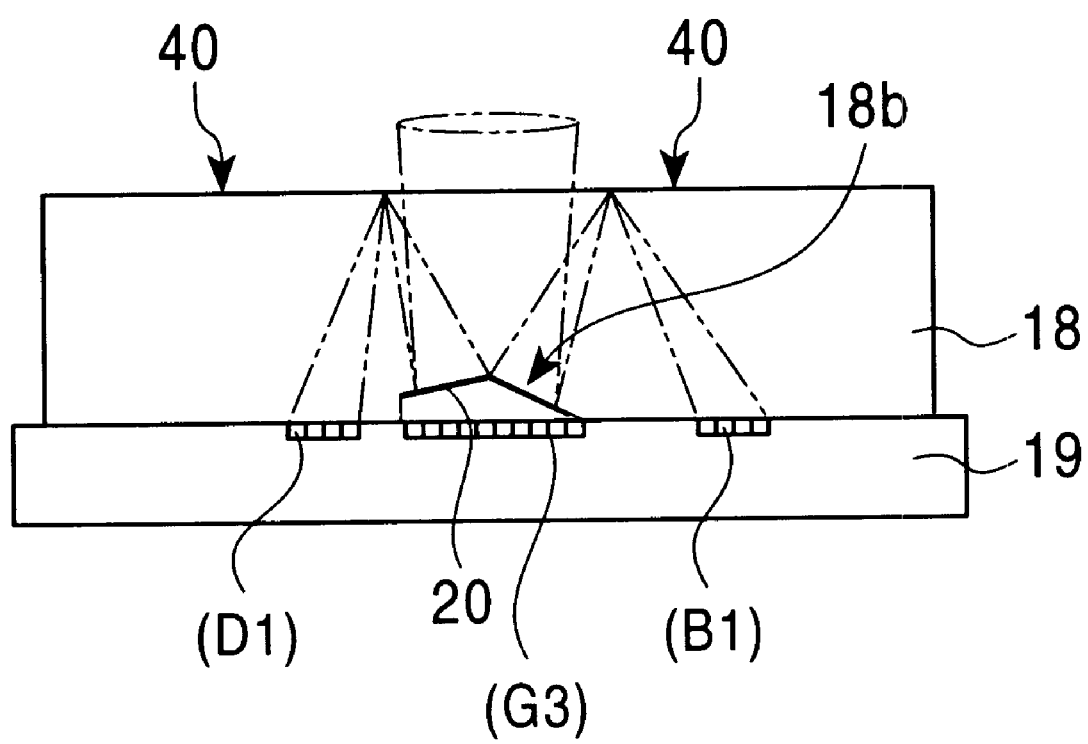
FIG. 10 is a sectional view taken along line X–X of FIG. 9.
Figure 11:
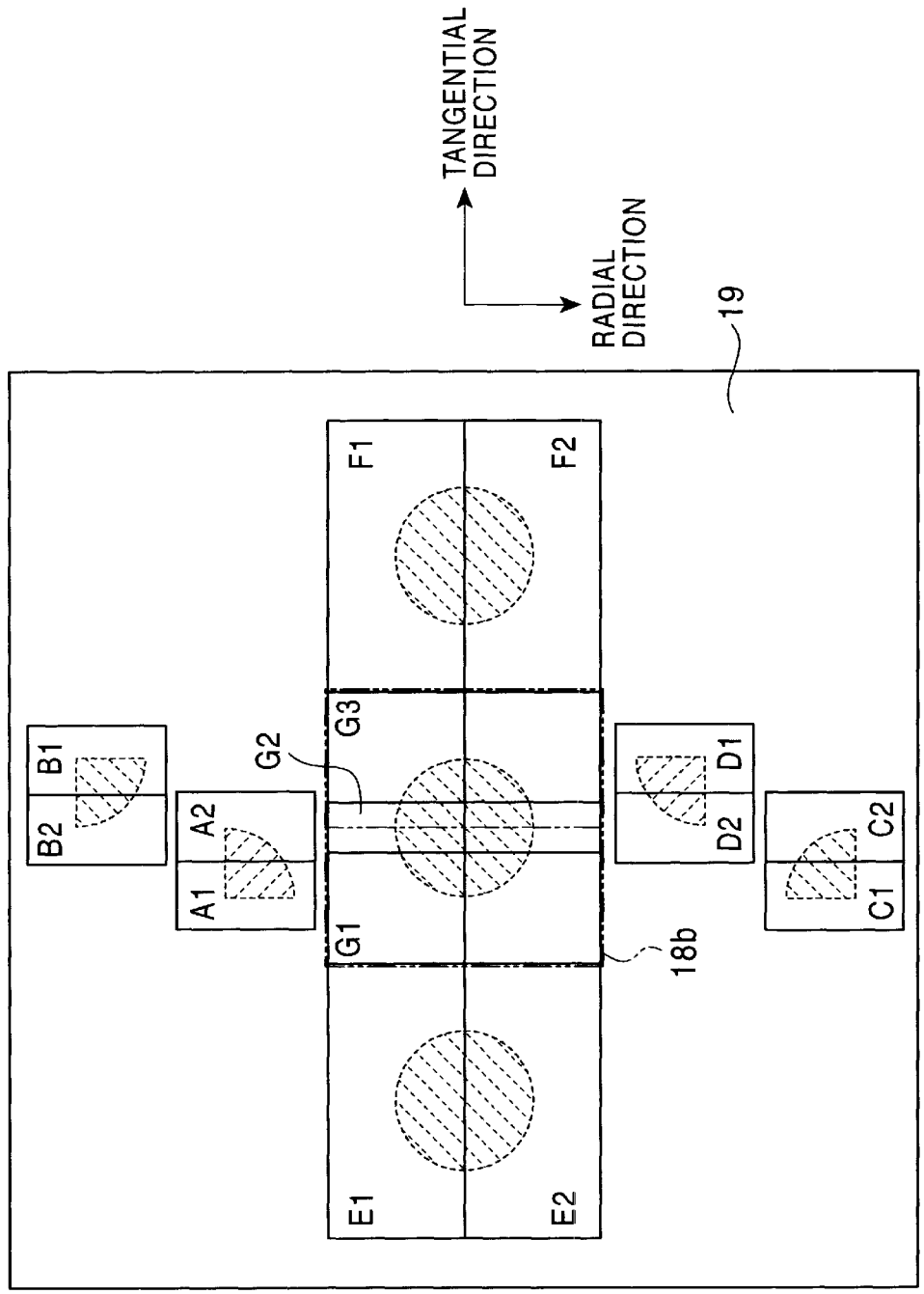
FIG. 11 is a plan view illustrating the arrangement of a photo-detector in an optical pickup device according to another embodiment of the present invention.

The pyramidal prism recessed surface 18b can have a variety of shapes other than those shown in FIG. 3. For example, as shown in FIG. 9, it is also preferable to employ a roof type prism recessed surface 18c which has the prism formed in the shape of a roof for reflecting the main beam return light in the same direction (in the radial direction). The roof type prism recessed surface 18c has a four-way-split surface with a ridge beam line corresponding to the parting line L1 and a step portion ST along the other parting line L2. The step portion ST is derived from the difference in angle of inclination among the adjacent four-way-split reflecting surfaces. As shown in FIG. 10, different angles of inclination are provided for the adjacent four-way-split reflecting surfaces so that the light-receiving elements (A1, A2), (B1, B2) for sector-shaped spots formed by return light that are reflected in the same direction do not overlap each other as well as (C1, C2) and (D1, D2) do not overlap each other. As shown in FIG. 11, the sector-shaped spots of the return light can be disposed in the radial direction from the center of the optical axis on the optical detector 19. Accordingly, when a reflecting surface is provided for the polarizing optical element 18, the number of reflecting surfaces 40 can be reduced to two without providing each of the first to fourth quadrant regions with a reflecting surface.

[Polarizing Optical Element and Optical Detector Using Semi Transparent Blaze Hologram]

Figure 12:
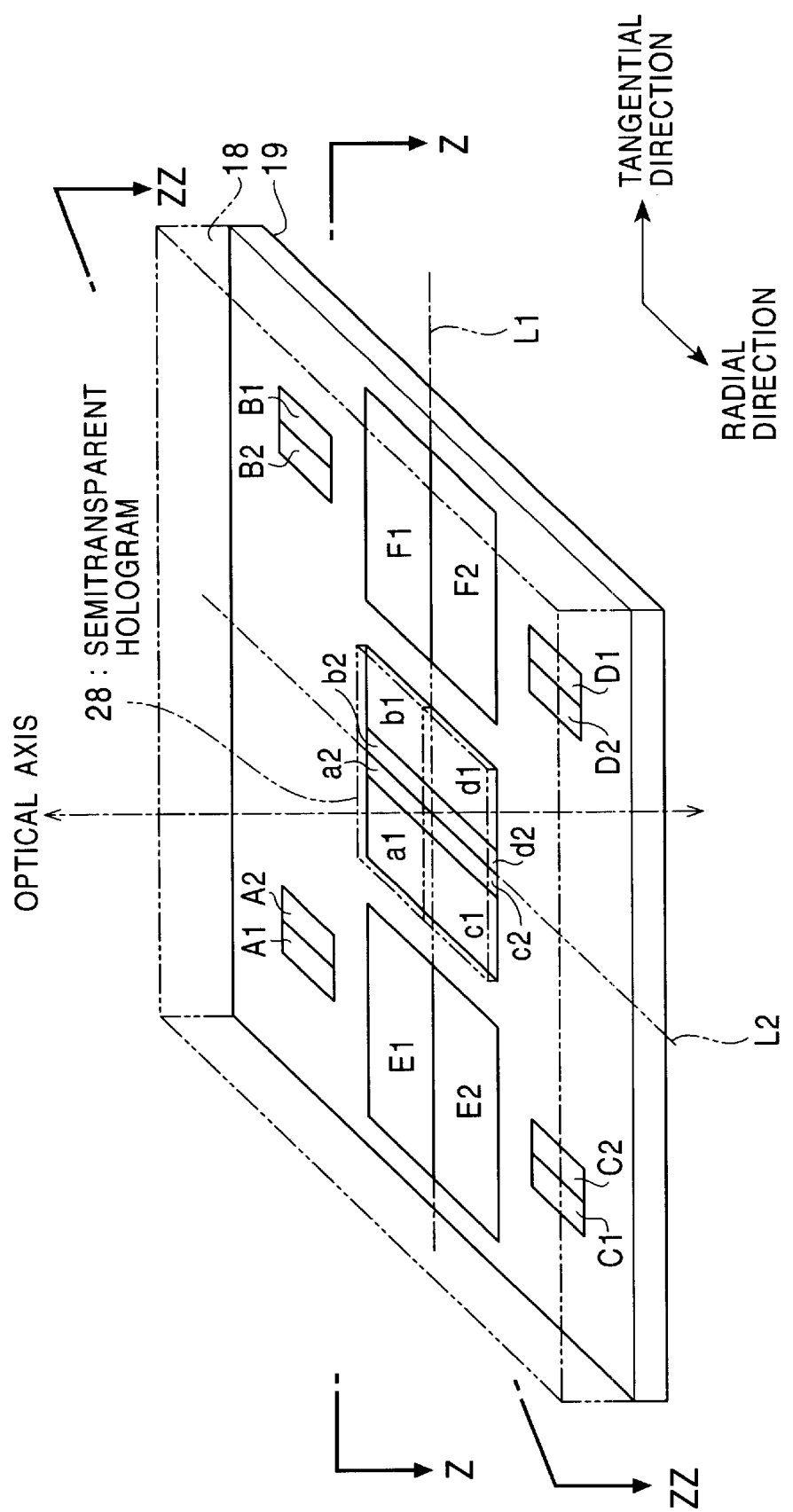
FIG. 12 is a schematic perspective view illustrating an assembly of an optical polarizing element and an optical detector in an optical pickup device according to an embodiment of the present invention.
Figure 13:
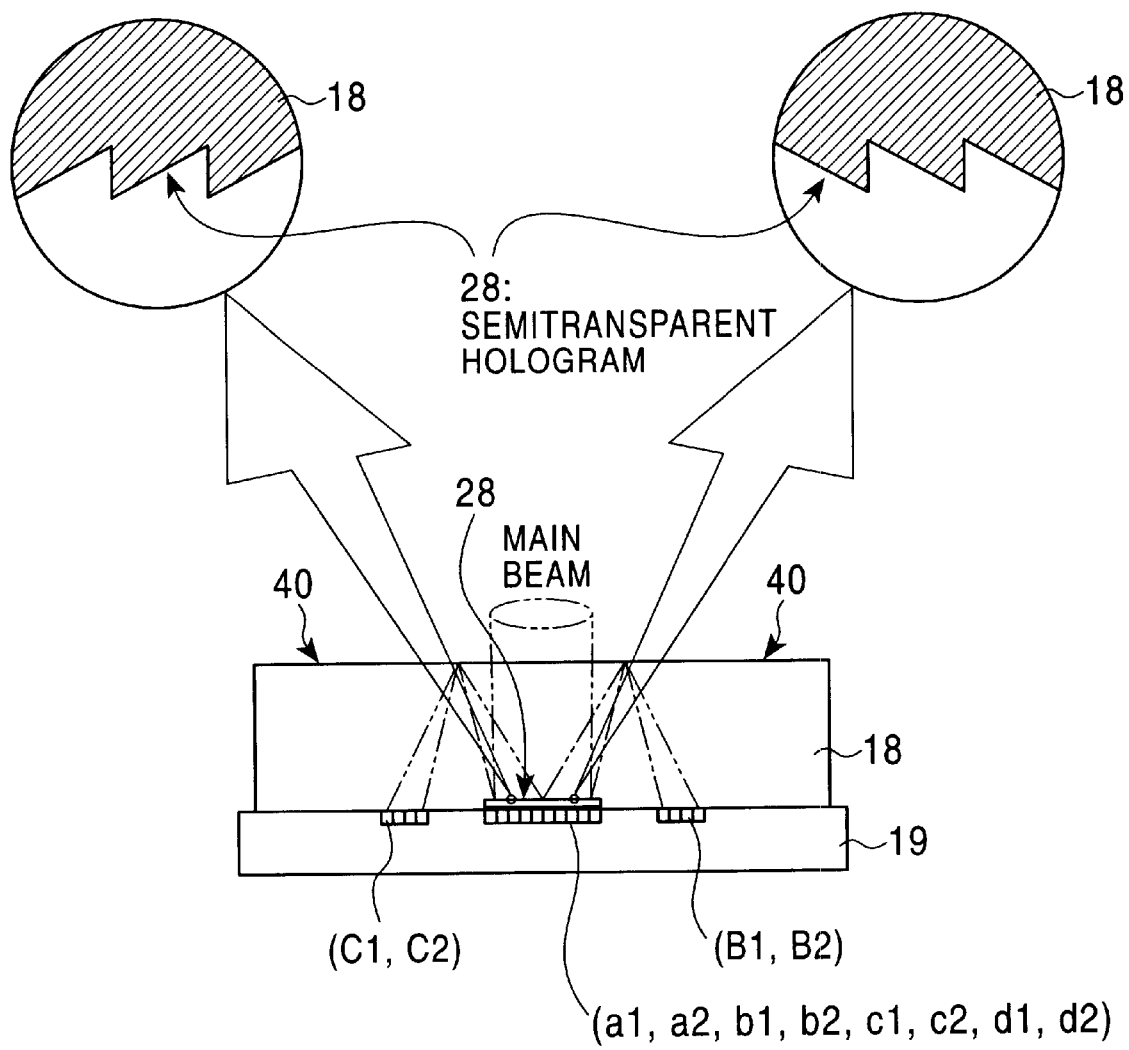
FIG. 13 is a sectional view taken along line ZZ–ZZ of FIG. 12.

As shown in FIG. 12, the following second embodiment includes light-receiving elements in the optical detector in accordance with the differential spot size method. In the parallel plate portion 18a of the polarizing optical element 18, the pyramidal prism recessed surface 18b is replaced with a semitransparent blaze hologram 28. The polarizing optical element 18 includes the parallel plate portion 18a formed of an optically transparent material and the semitransparent blaze hologram 28. The semitransparent blaze hologram 28 is formed on the side of light emission of the parallel plate portion (on the side of bonding of the optical detector 19) and provided with a four-way-splitting hologram portion having the center of division (the intersection of parting lines L1 and L2) being generally aligned with the optical axis of the main beam. Each portion of the four-way-splitting hologram portion corresponds to each four-way-split reflecting surface which is coated with a semitransparent film. As shown in FIG. 13, the semitransparent blaze hologram 28 is a blaze hologram which has a micro Fresnel lens as the aforementioned pyramidal prism recessed surface 18b, with each of the four-way-splitting hologram portion being formed as a grating. Without the semitransparent film, only the blaze hologram functions as the semitransparent blaze hologram.

As shown in FIG. 12, the main beam detector immediately below the semitransparent blaze hologram 28 further splits the three-way-split detector of the aforementioned embodiment along the parting line L1, and the light-receiving region G2 is further split along the parting line L2. Accordingly, this provides eight-way-split main-beam light-receiving elements (a1, a2, b1, b2, c1, c2, d1, d2). A DPD signal is thereby obtained from the transmitted return light on the eight-way-split detector immediately below the semitransparent blaze hologram 28. That is, on the surface of the optical detector 19, provided are the main-beam light-receiving elements (A1, A2), (B1, B2), (C2, C2), (D1, D2) each arranged in the first to fourth quadrant region. Also provided are the eight-way-split light-receiving elements (a1, a2, b1, b2, c1, c2, d1, d2) at the center and the side-beam light-receiving elements (E1, E2), (F1, F2) adjacent to the parting line L1. This surface is bonded to the side of the parallel plate portion 18a of the polarizing optical element 18.

Figure 14:
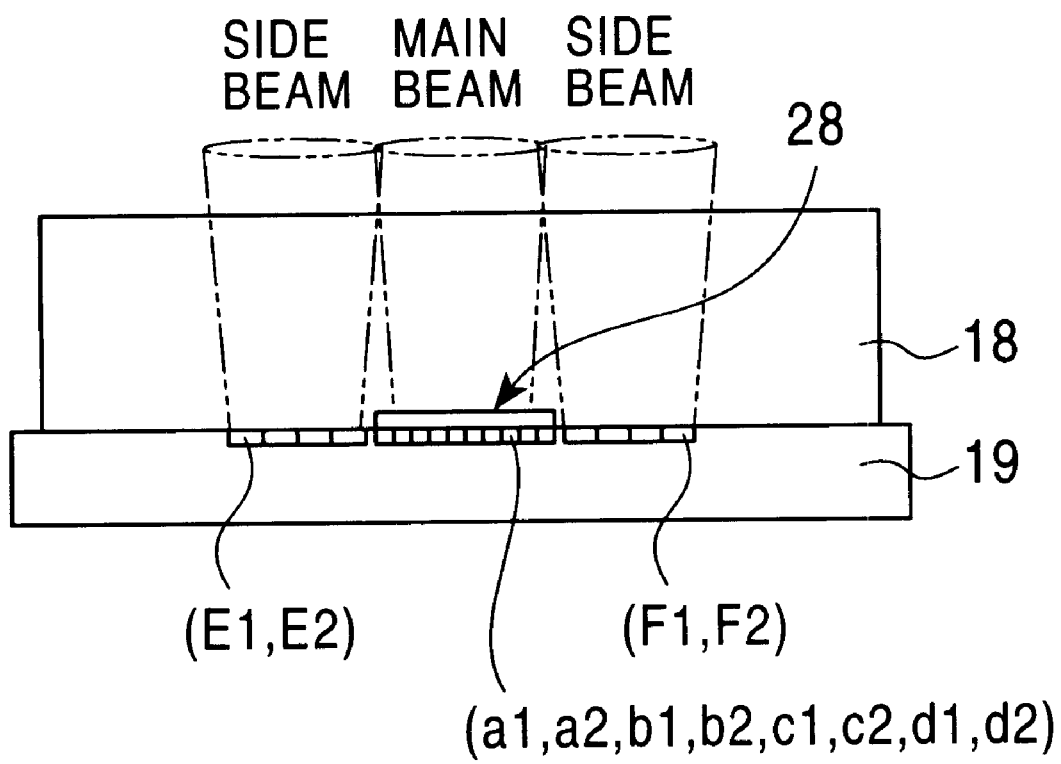
FIG. 14 is a sectional view taken along line Z–Z of FIG. 12.

As shown in FIG. 14, the semitransparent blaze hologram 28 is so arranged as to exert an effect only on the main beam return light. This allows the side beams to be incident on each of the light-receiving regions (E1, E2, F1, F2) of the side-beam light-receiving elements without being subjected to reflection of the semitransparent blaze hologram.

The aforementioned semitransparent blaze hologram 28 can be used to provide an optical action other than reflection. For example, a blaze hologram can be provided with the actions of prism and concave lens. The focal length of a light beam incident on the main-beam light-receiving elements (A1, A2), (B1, B2), (C2, C2), (D1, D2) can be thereby made longer than the focal length that has been originally determined in the detecting system.

The focusing servo control serves to generate the focus error signal by the eight-way-split detector using the main beam and the selective differential spot size method using the output of the main-beam light-receiving elements. The focus error signal is indicative of the sum total of the sum of the differences between the signals delivered from the two light-receiving regions (A1, A2), (B1, B2), (C1, C2), (D1, D2) of the main-beam light-receiving elements. The sum total also includes the difference between the total outputs delivered from the light-receiving regions (a1, b1, c1, d1) and the light-receiving regions (a2, b2, c2, d2) paired therewith. In other words, using the reference symbols of the light-receiving elements of the optical detector 19 as their outputs, the focus error signal FES is expressed by the following equation (10). That is, $$FES = (A1 + B1 + C1 + D1 + a1 + b1 + c1 + d1) - (A2 + B2 + C2 + D2 + a2 + b2 + c2 + d2) \tag{10}$$

Figure 15:
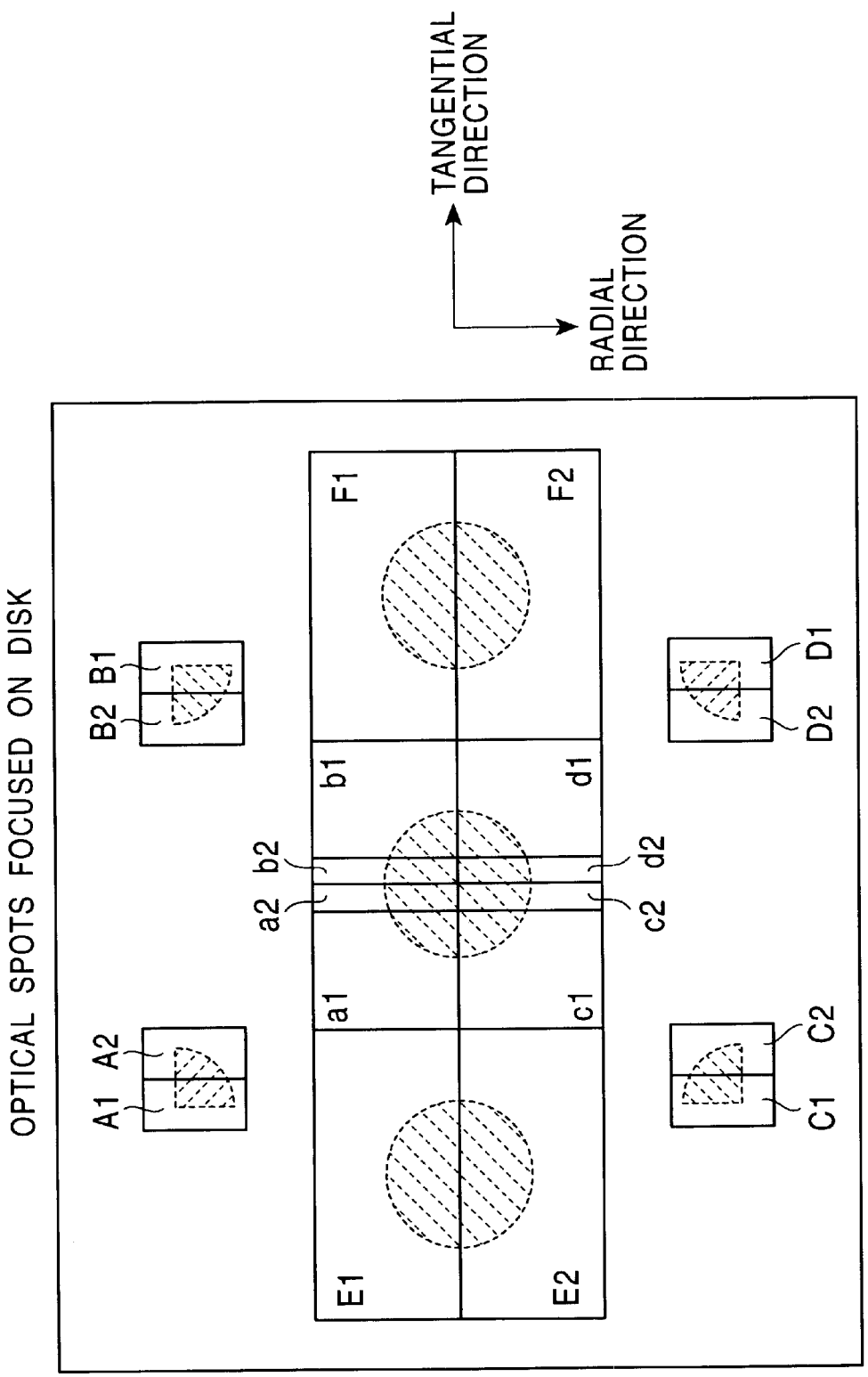
FIGS. 15 to 17 are plan views illustrating the arrangement of a photo-detector in an optical pickup device according to another embodiment of the present invention.

FIG. 15 is a view illustrating the state of a return light spot at each of the light-receiving elements with the light beam being focused on the optical disk. With the beam being focused on the optical disk, the return light is split and incident on each quadrant region of the main-beam light-receiving elements (A1, A2), (B1, B2), (C1, C2), (D1, D2) of the optical detector 19. At this time, each of the split return light is incident across the parting line as a quarter-circle optical spot having the same shape and area, or a sector-shaped optical spot. The eight-way-split detector (a1, b1, c1, d1, a2, b2, c2, d2) and the side-beam light-receiving elements (E1, E2), (F1, F2) receive the transmitted return light having the same circular optical spot. Therefore, with the beam being focused on the optical disk, the FES becomes zero from the aforementioned equation (10) since the light detecting electrical signals delivered from any pair of light-receiving regions are equal to each other.

Figure 16:
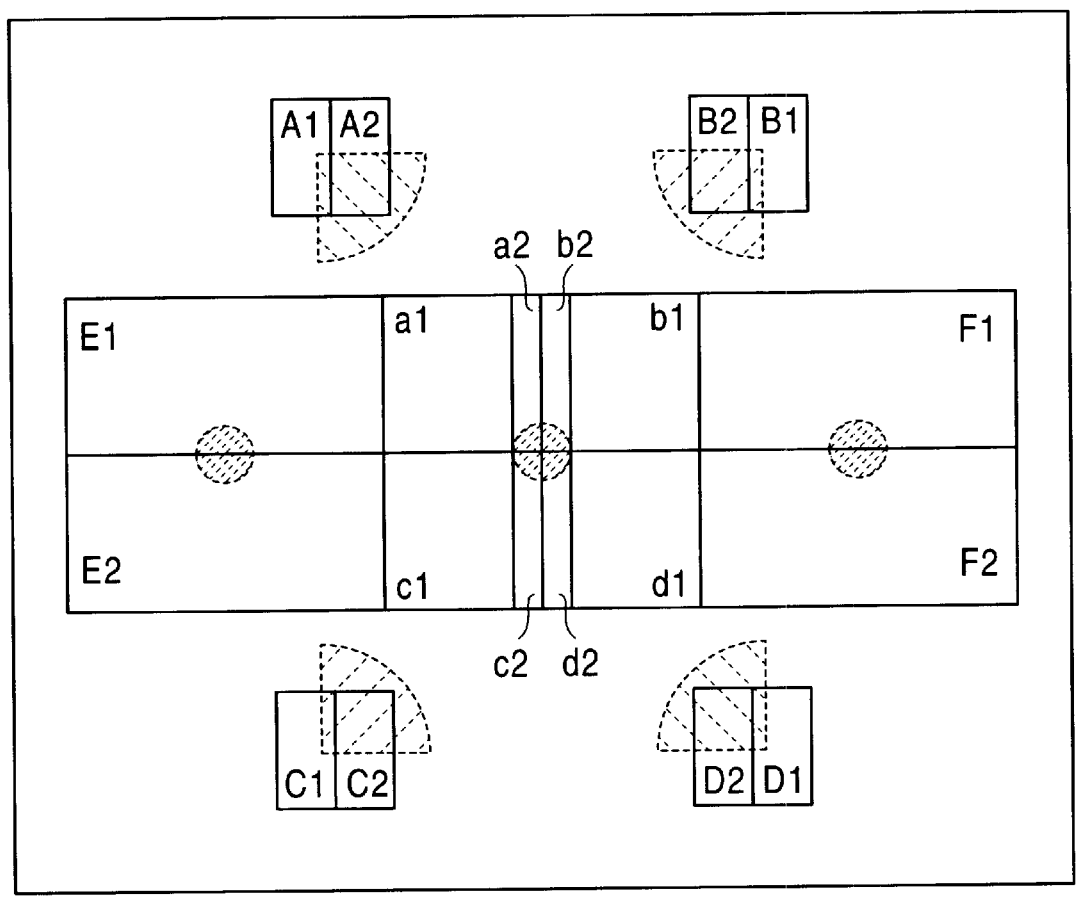

FIG. 16 is a view illustrating the state of the optical spot of return light when the optical disk is placed farther away from the focal point of the objective lens with the light beam being out of focus. With the optical disk being placed farther away from the focal point of the objective lens, the split sector-shaped optical spots of the return light expand to diverge each in the direction of L1, thereby causing the area to increase on the side of the light-receiving regions (A2), (B2), (C2), (D2). At the same time, the circular optical spots at the center decrease in area to be less in area from the light-receiving regions (a1, b1, c1, d1) of the eight-way-split detector to (a2, b2, c2, d2). Therefore, with the optical disk being placed farther away from the focal point of the objective lens, the FES takes generally on a negative value from the aforementioned equation (10).

Figure 17:
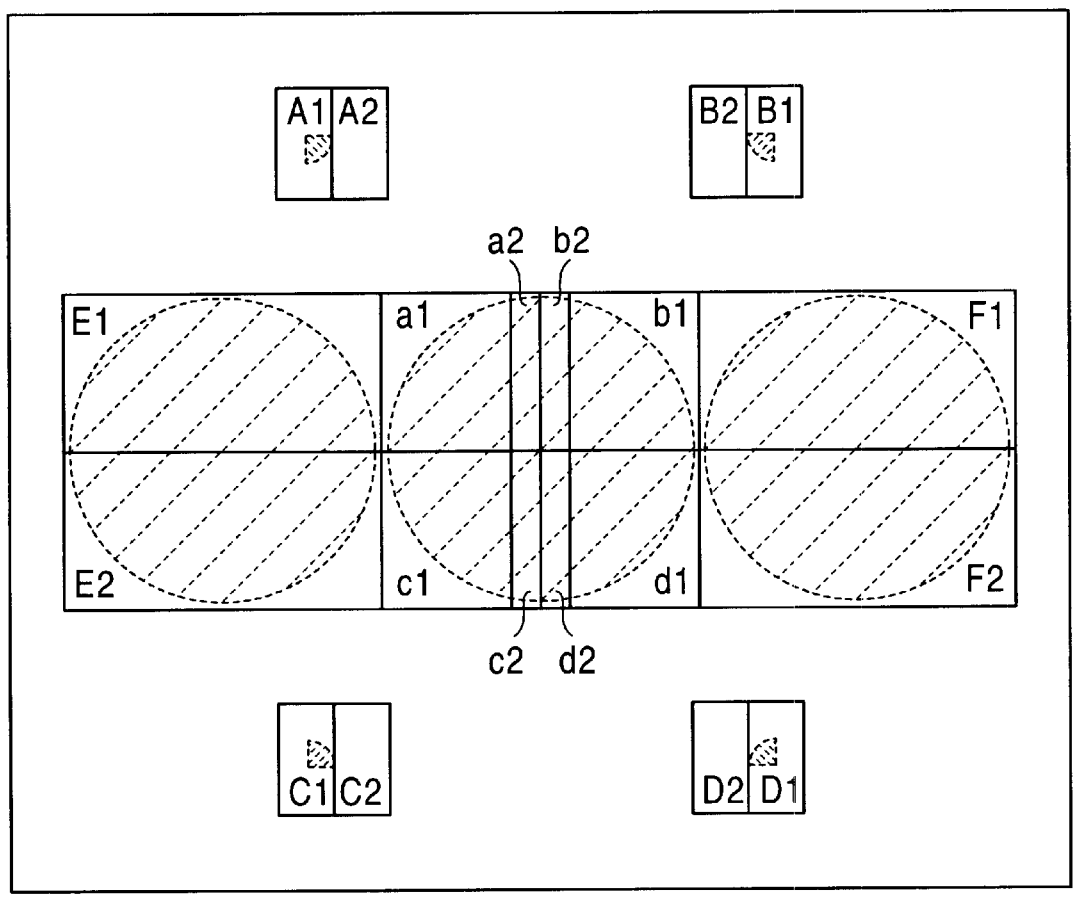

FIG. 17 is a view illustrating the state of a return light spot when the optical disk is placed closer to the objective lens than to the focal point thereof. Thus, the figure shows the state of the return light spots on the light-receiving elements (A1, A2), (B1, B2), (C1, C2), (D1, D2) in the first to fourth quadrant regions. With the optical disk being placed closer to the objective lens than to the focal point thereof, the split sector-shaped optical spots of the return light are decreased in area, each spot being extended in the direction of L1 to be less in area towards light-receiving regions (A1), (B1), (C1), (D1). At the same time, the circular optical spots at the center increase in area to be larger in area from the light-receiving region (G2) of the three-way-split detector towards (G1, G3). Therefore, with the optical disk being placed closer to the objective lens than to the focal point thereof, the FES takes generally on a positive value from the aforementioned equation (10).

As described above, the FES expressed by the aforementioned equation (10) makes it possible to determine as follows. That is, the optical disk is placed at the focal position when the FES is zero, farther away from the focal position when the FES has a negative value, and closer to the objective lens than to the focal position thereof when the FES has a positive value. Accordingly, the focusing servo control can be positively provided by means of electrical feedback signals with an inverted positive or negative sign of the focus error signal FES and through the control of an objective lens drive mechanism provided on an objective lens 7 of the optical pickup device 100 to make the value of FES zero.

On the other hand, other control electrical signals can be obtained in the same way as in the aforementioned embodiment.

[Polarizing optical element and optical detector using reflecting blaze hologram]

Figure 18:
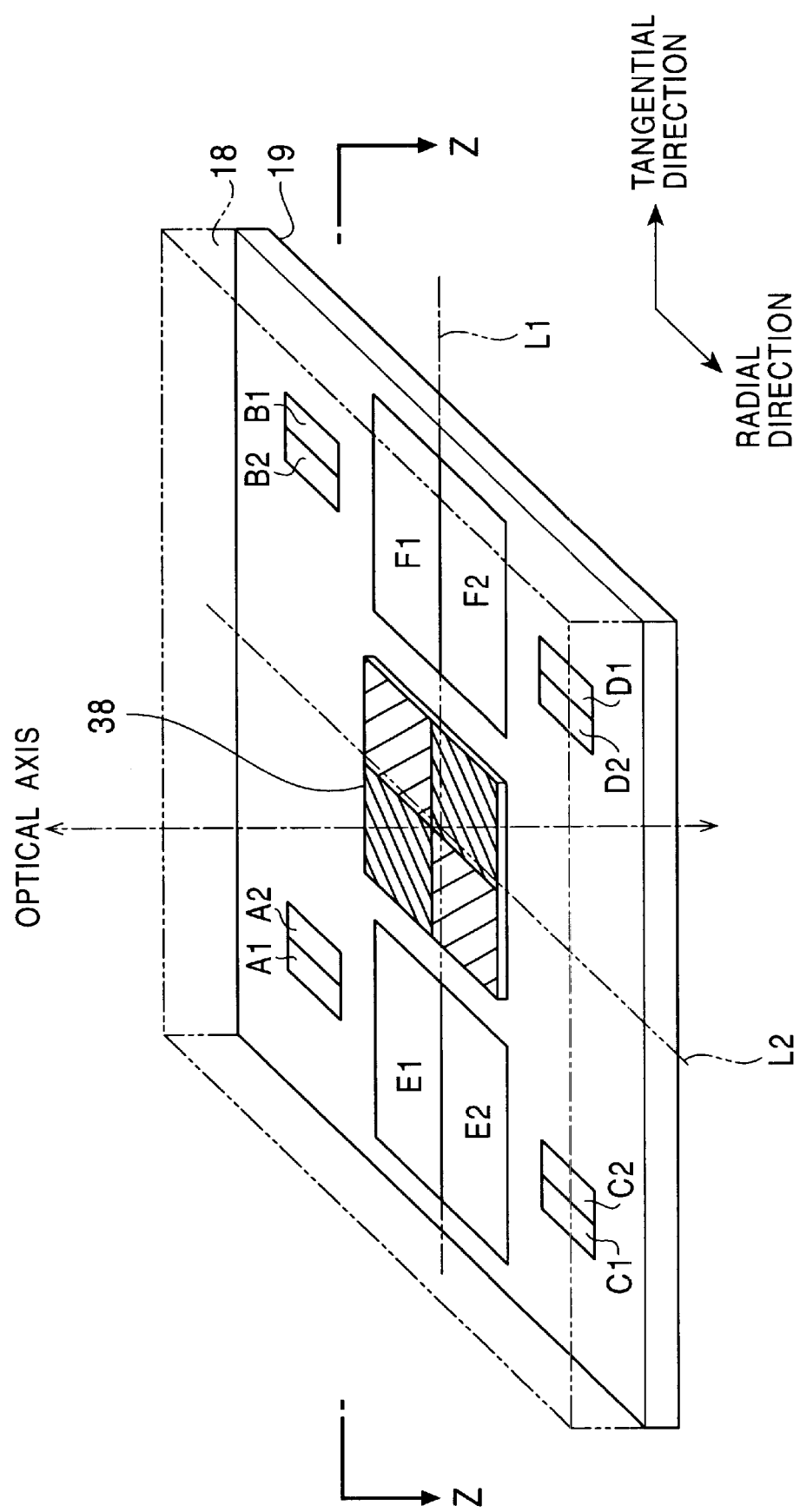
FIG. 18 is a schematic perspective view illustrating an assembly of an optical polarizing element and an optical detector in an optical pickup device according to an embodiment of the present invention.

As shown in FIG. 18, the following third embodiment includes the parallel plate portion 18a of the polarizing optical element 18 in which the pyramidal prism recessed surface 18b and the semitransparent blaze hologram 28 of the aforementioned embodiment are replaced with a reflecting blaze hologram 38. In addition, the third embodiment is not provided with the three-way-split detector (G1, G2, G3) and the eight-way-split detector (a1, b1, c1, d1, a2, b2, c2, d2). The polarizing optical element 18 includes the parallel plate portion 18a formed of an optically transparent material and the reflecting blaze hologram 38. The reflecting blaze hologram 38 is formed on the side of light emission of the parallel plate portion (on the side of bonding of the optical detector 19) and provided with a four-way-splitting hologram portion having the center of division (the intersection of parting lines L1 and L2) being generally aligned with the optical axis of the main beam. The four-way-splitting hologram portion corresponds to the four-way-split reflecting surface.

Figure 19:
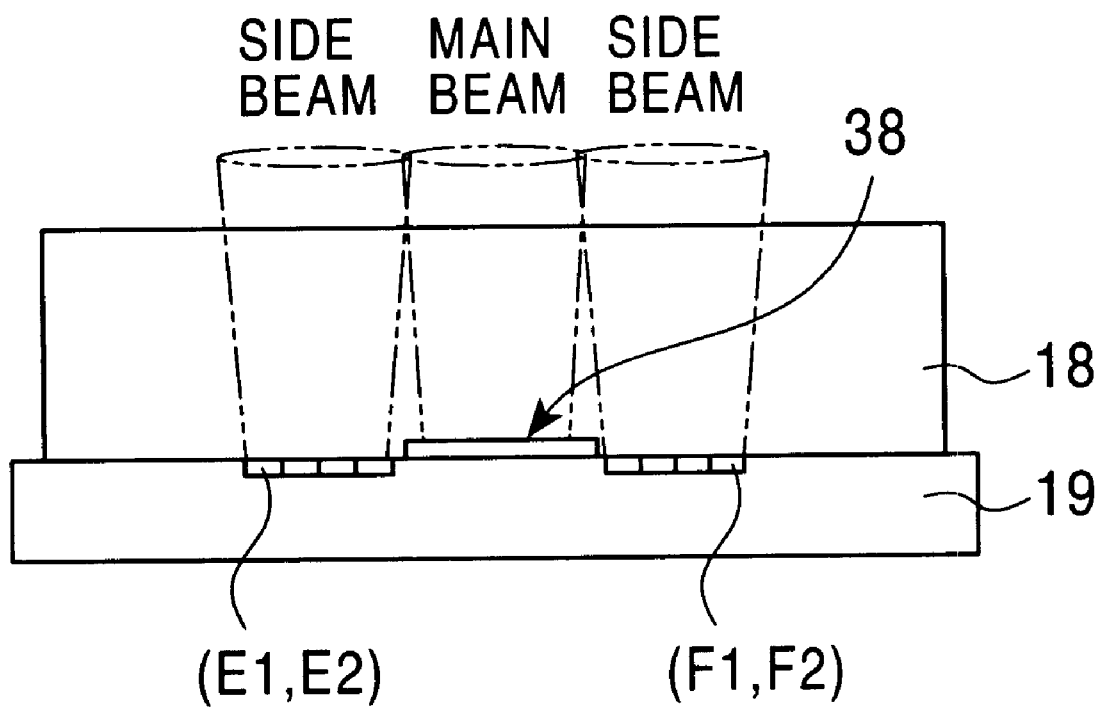
FIG. 19 is a sectional view taken along line Z–Z of FIG. 18.

As shown in FIG. 19, in the third embodiment, a side-beam detector and the main-beam reflecting blaze hologram 38 are disposed where three beams of return light of the main and side beams can be spatially split. This embodiment is different from the first and second embodiments in that the polarizing optical element 18 is not of the semitransparent type (a main beam prism or hologram) but of the reflecting type. In other words, of the return light beams incident on each light-receiving element, only the main beam is totally reflected.

The reflecting blaze hologram 38 acting as a four-way-split reflecting surface splits the main beam return light in four for each region. In addition, the reflecting blaze hologram 38 includes an optical function for providing the return light, which passes through the adjacent regions on the same side across the parting lines L1, L2, with astigmatisms rotated by 90 degrees relative to each other along the optical path. Thus, the reflecting blaze hologram 38 has two functions. That is, one function serves to split in four or separate the main beam return light into the first to fourth quadrant regions and the other to provide the light beams of the first and third and the second and fourth quadrant regions with astigmatisms different in direction by 90 degrees relative to each other. The function for splitting the return light is the same as that of the blaze hologram of the aforementioned embodiment. The function of providing astigmatism allows each four-way-splitting hologram portion to act as two cylindrical lenses. The center axises of the cylindrical lenses work as a pair (the first and third quadrants) that extends along the direction of the track of the optical disk and a pair (the second and fourth quadrants) that extends at 90 degrees to the direction of extension of the track. In general, consider an optical system having a cylindrical lens placed in a converging optical path with the center axis of the lens being disposed perpendicularly thereto, that is, an optical system that is provided with astigmatism. Such an optical system forms two line images orthogonal to each other and forms an image plane (hereinafter referred to as the least scattering circular image plane) between the line images where a light beam has the shape of a circle (the least scattering circle). In this embodiment, the reflecting blaze hologram 38 provides the return light with astigmatism and the main-beam light-receiving elements (A1, A2), (B1, B2), (C1, C2), (D1, D2) are placed on the least scattering circular image plane of each four-way-split return light.

Each of the main beam light-receiving elements (A1, A2), (B1, B2), (C1, C2), (D1, D2) consists of two light-receiving regions. The regions are split by a two-way-splitting line that extends generally parallel to the parting line L1 disposed perpendicular to the direction of extension of the track. The two-way-splitting line LL extends to where the signals generated by return light spots received on the light-receiving elements on the least scattering circular image plane and delivered from a pair of light-receiving regions are generally equal to each other.

The reflected main beam is reflected on the reflecting surface 40 of the parallel plate portion 18a that covers the optical detector 19 and then impinges upon the main beam light-receiving elements (A1, A2), (B1, B2), (C1, C2), (D1, D2). In this example, the differential spot size method cannot be used because of the absence of a photo-detector immediately below the reflecting blaze hologram 38.

In this embodiment, it is possible to generate a focus error signal from the sum of differences of the signals delivered from the light-receiving region of each light-receiving elements. In other words, using the reference symbols of the light-receiving elements of the optical detector 19 as their outputs, the focus error signal FES is expressed by the following equation (11). That is, $$FES=(A1+B1+C1+D1)-(A2+B2+C2+D2) \tag{11}$$

Now, referring to FIGS. 20 to 22, described below is the action of the optical detector 19 provided when the focal position of the objective lens of the optical pickup device 100 is varied.

Figure 20:
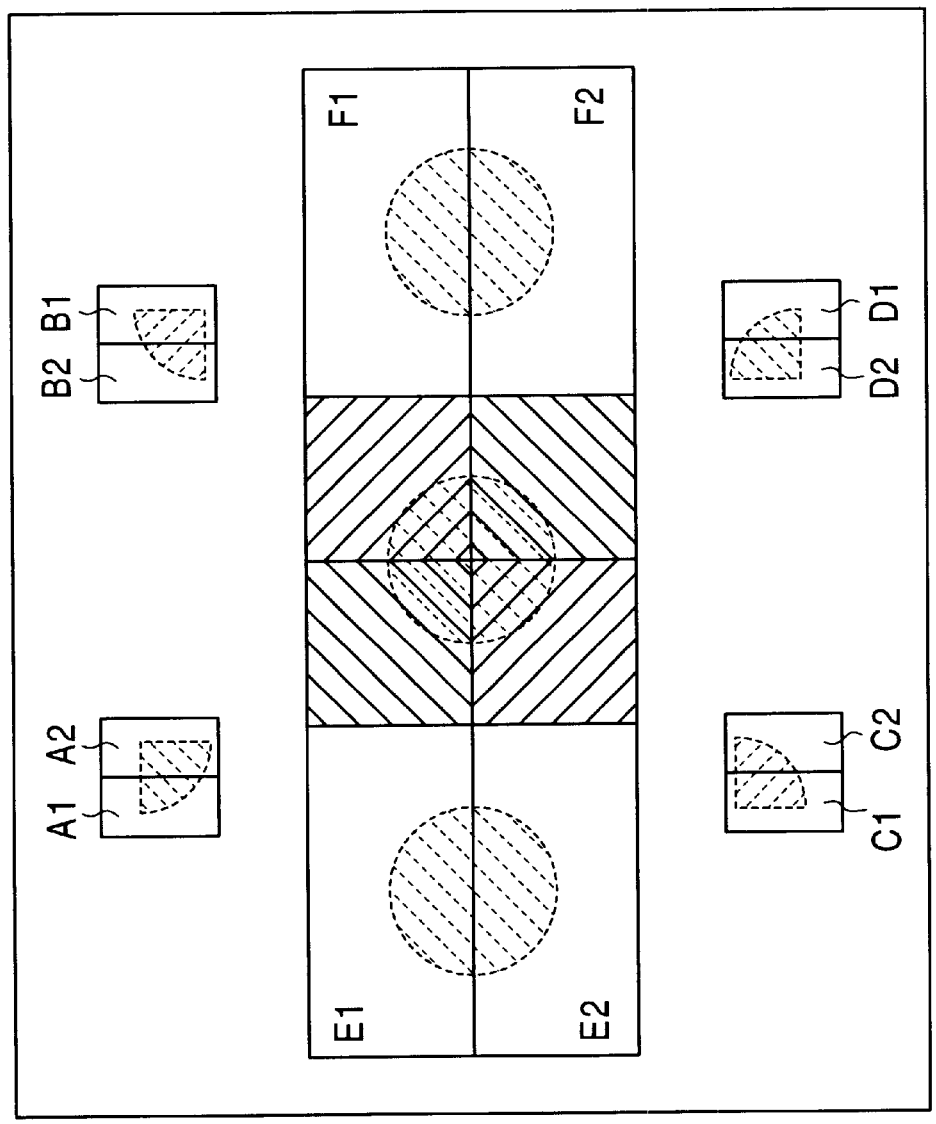
FIGS. 20 to 22 are plan views illustrating the arrangement of a photo-detector in an optical pickup device according to another embodiment of the present invention.

FIG. 20 is a view illustrating the state of a return light spot at the optical detector 19 with the light beam from the optical pickup device 100 being focused on the information storage surface of the optical disk. With the beam being focused on the surface, the return light provided with astigmatism on each quadrant region of the reflecting blaze hologram 38 is split and incident. At this time, each of the split return light is incident across the parting line LL as the quarter least-scattering-circle optical spot having the same shape and size (area), or a sector-shaped optical spot. As shown in FIG. 20, with the beam being focused on the surface, the FES becomes zero from the aforementioned equation (11) since the light detecting electrical signals delivered from any pair of main beam light-receiving elements (A1, A2), (B1, B2), (C1, C2), (D1, D2) are equal to each other.

Figure 21:
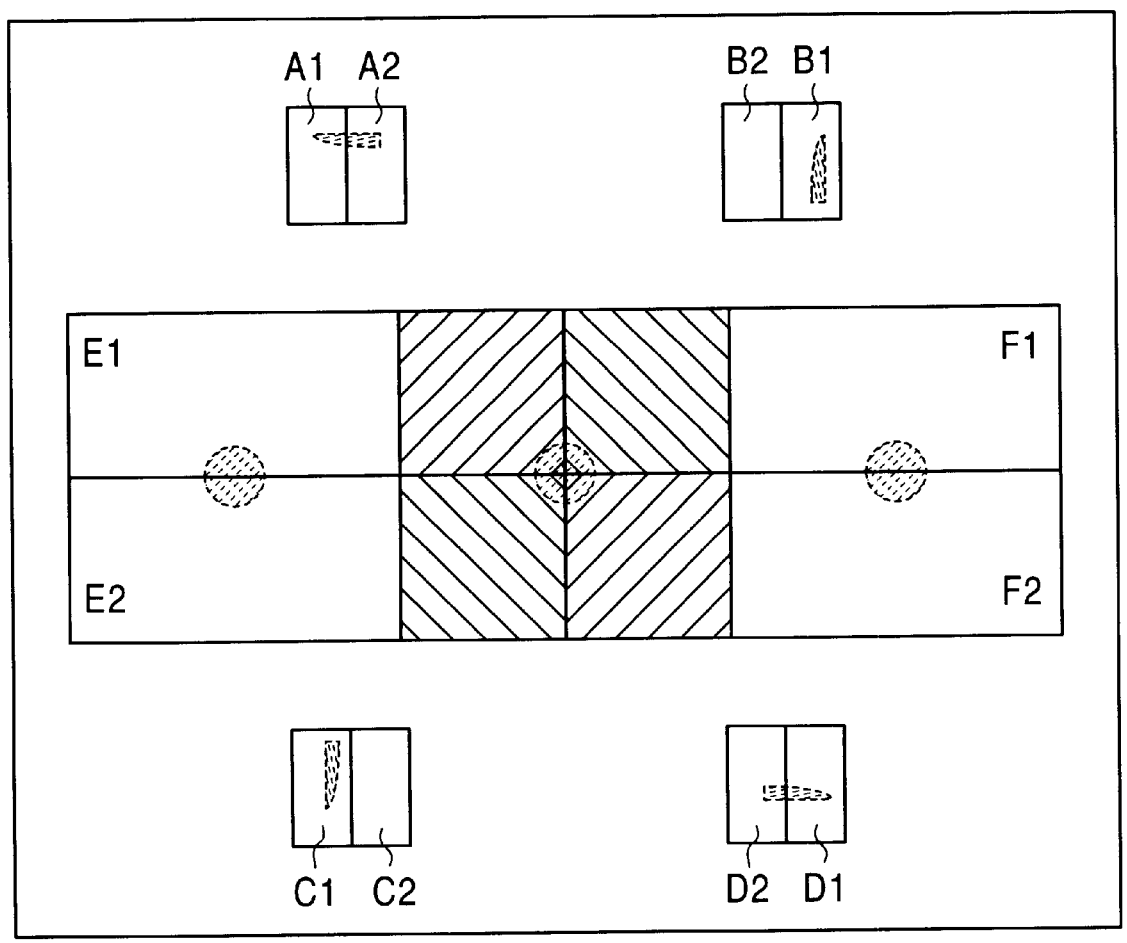

FIG. 21 is a view illustrating the state of a return light spot on the optical detector 19 when the light beam from the optical pickup device 100 is out of focus on the information storage surface of the optical disk and the optical disk is placed farther away from the focal point of the objective lens. With the optical disk being placed farther away from the focal point, the light beams provided with astigmatism on the first and third quadrant regions of the reflecting blaze hologram 38 are each incident as an optical spot in the shape of a line segment that extends in the direction of L2 on the light-receiving regions B1, C1. On the other hand, the light beams provided with astigmatism on the second and fourth quadrant regions of the reflecting blaze hologram 38 are each incident as an optical spot in the shape of a line segment that extends in the direction of L1 across the light-receiving regions (A1, A2), (D1, D2). Therefore, with the optical disk being placed farther away from the focal point, the FES takes generally on a positive value from the aforementioned equation (11) since these line-segment-shaped optical spots have the same shape and size (area).

Figure 22:
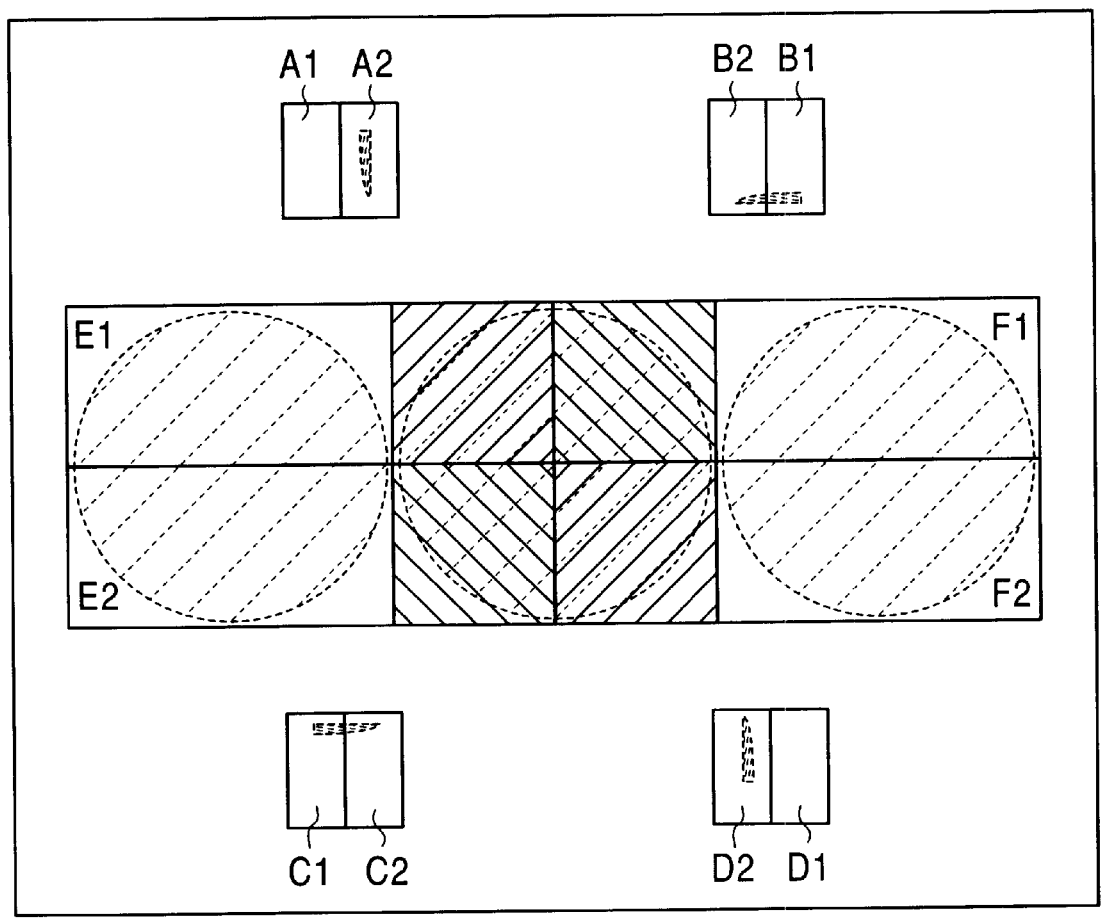

FIG. 22 is a view illustrating the state of a return light spot on the optical detector 19 when the light beam from the optical pickup device 100 is out of focus on the information storage surface of the optical disk and the optical disk is placed closer the objective lens than to the focal point thereof. Consider the case where the optical disk is placed closer to the objective lens than to the focal point thereof. In this case, the light beams provided with astigmatism on the first and third quadrant regions of the reflecting blaze hologram 38 are each incident as an optical spot in the shape of a line segment extending in the direction of L1 across the light-receiving regions (B1, B2), (C1, C2). On the other hand, the light beams provided with astigmatism on the second and fourth quadrant regions of the reflecting blaze hologram 38 are each incident as an optical spot in the shape of a line segment that extends in the direction of L2 on the light-receiving regions A2, D2. Therefore, with the optical disk being placed closer to the objective lens than to the focal point thereof, the FES takes generally on a negative value from the aforementioned equation (11) since these line-segment-shaped optical spots have the same shape and size (area).

Accordingly, the focusing servo control can be positively provided by means of electrical feedback signals with an inverted positive or negative sign of the focus error signal FES and through the control of an objective lens drive mechanism provided on an objective lens 7 of the optical pickup device 100 to make the value of FES zero.

On the other hand, other control electrical signals can be obtained in the same way as in the aforementioned embodiment.

[Polarizing Optical Element and Optical Detector Using Transparent Blaze Hologram]

Figure 23:
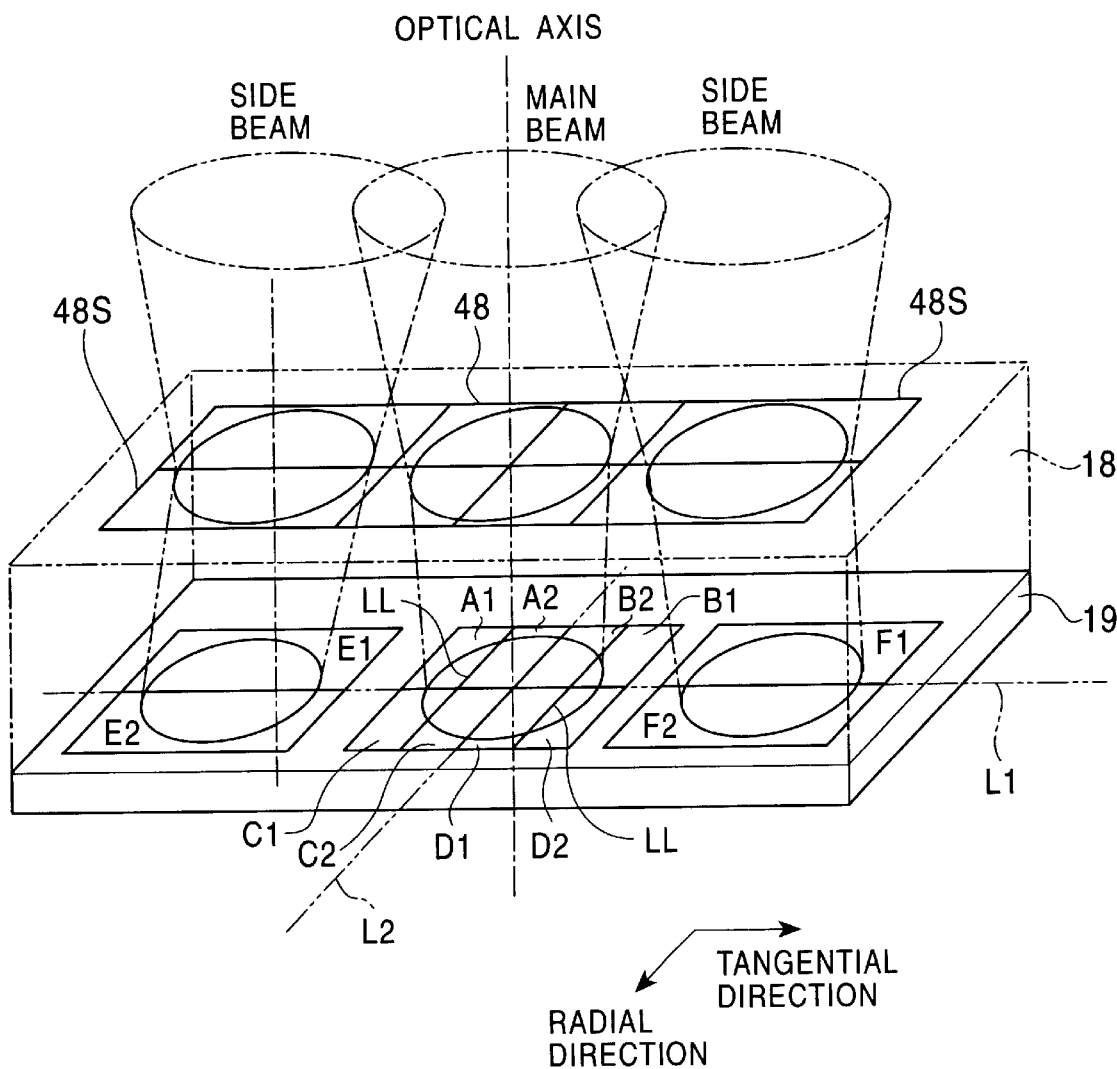
FIG. 23 is a schematic perspective view illustrating an assembly of an optical polarizing element and an optical detector in an optical pickup device according to an embodiment of the present invention.

As shown in FIG. 23, the following fourth embodiment includes a polarizing optical element using a transparent blaze hologram 48 for providing astigmatism instead of the reflecting blaze hologram 38 for providing astigmatism according to the third embodiment. The polarizing optical element 18 includes the parallel plate portion 18a formed of an optically transparent material and the transparent blaze hologram 48. The transparent blaze hologram 48 is formed on the side of light incidence of the parallel plate portion and provided with a four-way-splitting hologram portion having the center of division (the intersection of parting lines L1 and L2) being generally aligned with the optical axis of the main beam. Each four-way-splitting hologram portion corresponds to each four-way-split reflecting surface. Like the transparent blaze hologram 48 according to the aforementioned embodiment, the semitransparent blaze hologram 28 provides astigmatism for the main beam return light. In addition, the polarizing optical element has a two-way-splitting hologram 48S which is formed on the side of light incidence of the parallel plate portion and splits in two to transmit the side beam return light to each of the two-way-split regions along the parting line L1 that extends in the direction of extension of the track.

Figure 24:
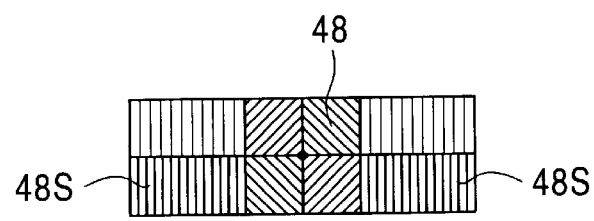
FIG. 24 is a schematic plan view illustrating the pattern of a transmission hologram element in the device of FIG. 23.

As shown in FIGS. 23 and 24, the two-way-splitting hologram 48S is disposed on both sides of the transparent blaze hologram 48, where each of the three beams of the main and side beam return light can be spatially split. The two-way-splitting hologram 48S is adapted to split the side beam return light in two across the parting line L1 and thereby improve the accuracy for detecting the push-pull signal. This is effective in using the DPP (differential push-pull method) for tracking.

Each of the side beam light-receiving elements (E1, E2), (F1, F2) includes two light-receiving regions that are split in two along the parting line L1 that extends in the direction of the track. The differential push-pull method provides the tracking servo control in accordance with the sum signal of the differences between the signals delivered each from the two light-receiving regions of the side beams light-receiving elements.

In such a polarizing optical element, each detector of the optical detector 19 is disposed where the main and side beam return light is each spatially separated. The transparent blaze hologram element 48 acts on the main beam to split the main beam in four on the first to fourth quadrant regions and provides the return light beams of the first and third quadrant regions and the second and fourth quadrant regions with astigmatisms rotated by 90 degrees relative to each other around the optical path. Then, the main beam is incident on the first to fourth quadrant regions of the main beam light-receiving elements (A1, A2), (B1, B2), (C1, C2), (D1, D2), which are formed on the side of the light emission of the parallel plate portion. Each of the main beam light-receiving elements consists of two light-receiving regions that are split by a two-way-splitting line LL that extends generally in parallel to the parting line disposed perpendicular to the direction of extension of the track. When the least scattering circle is provided by the astigmatism, the two-way-splitting line LL extends to where the signals generated by the quarter-circle spots of return light received on the light-receiving elements and delivered from each of the light-receiving regions are generally equal to each other.

A focus error signal is generated from the sum of the differences between the signals delivered from respective two light-receiving regions of the main beam light-receiving elements (A1, A2), (B1, B2), (C1, C2), (D1, D2).

Now, referring to FIGS. 25 to 27, described below is the action of the optical detector 19 provided when the focal position of the objective lens according to this embodiment is varied.

Figure 25:
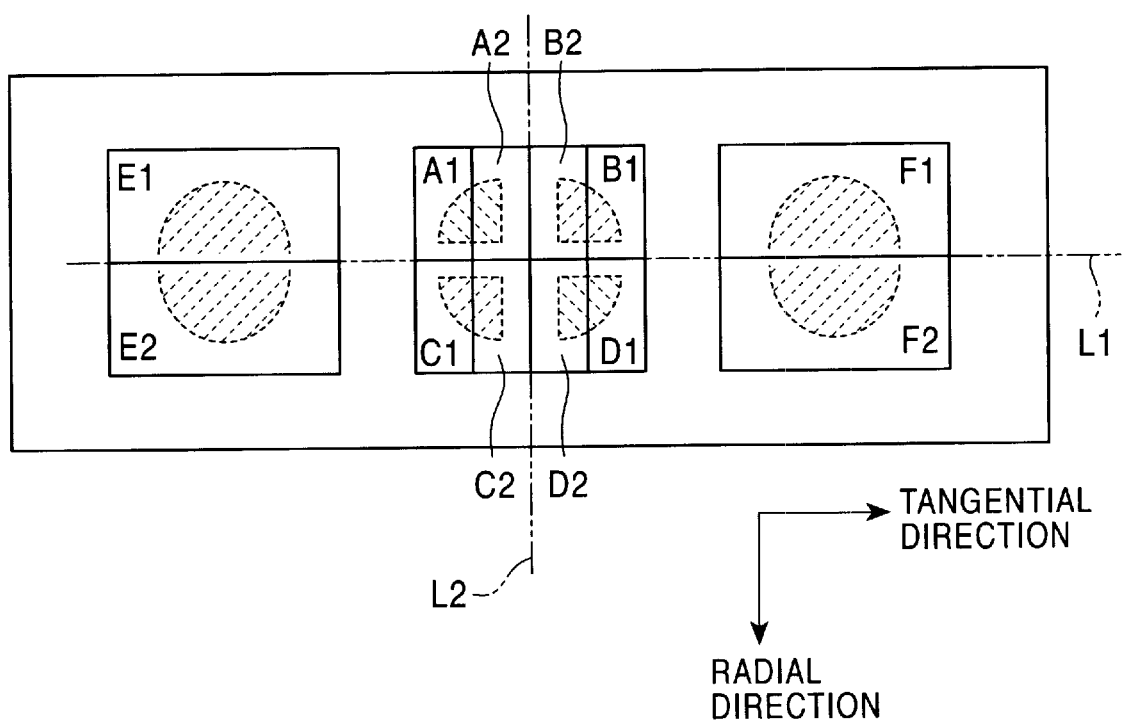

FIG. 25 is a view illustrating a return light spot at the optical detector 19 with the light beam from the optical pickup being focused on the information storage surface of the optical disk. With the beam being focused on the surface, the return light provided with astigmatism on each quadrant region of the reflecting blaze hologram 38 is split and incident. At this time, each of the split return light is incident across the parting line LL as the quarter least-scattering-circle optical spot having the same shape and size (area), or a sector-shaped optical spot. As shown in FIG. 25, with the beam being focused on the surface, the FES becomes zero from the aforementioned equation (11) since the light detecting electrical signals delivered from any pair of main beam light-receiving elements (A1. A2), (B1, B2), (C1, C2), (D1, D2) are equal to each other.

Figure 26:
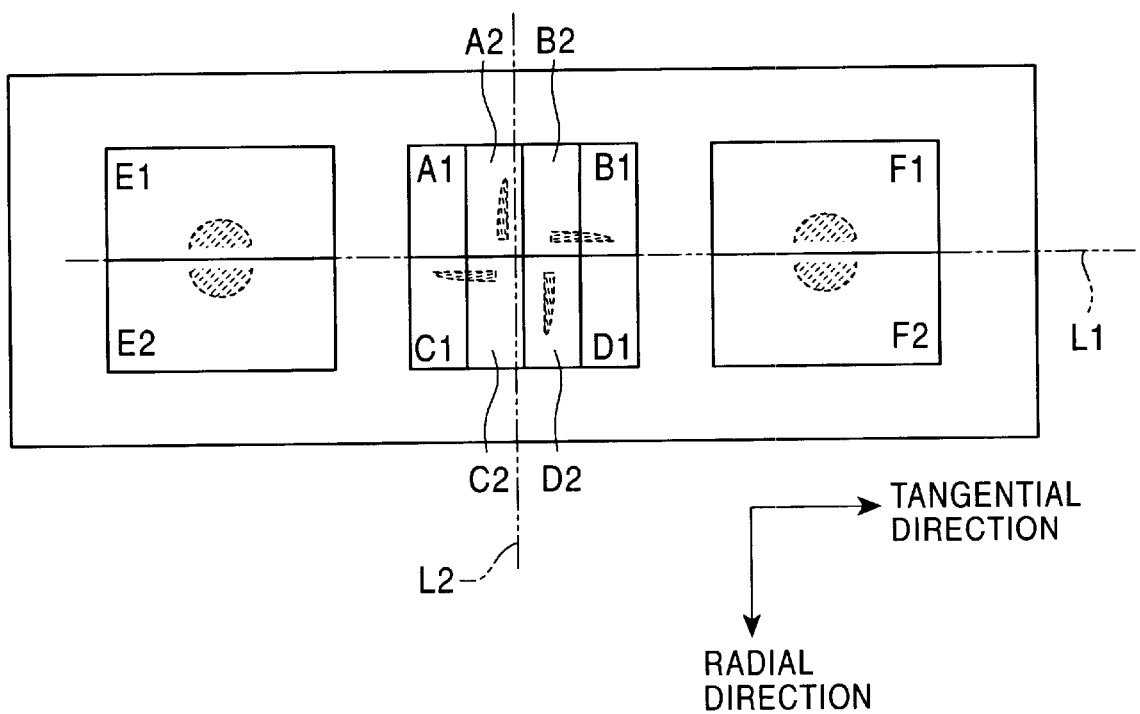

FIG. 26 is a view illustrating the state of a return light spot on the optical detector 19 when the light beam from the optical pickup device 100 is out of focus on the information storage surface of the optical disk and the optical disk is placed farther away from the focal point of the objective lens. With the optical disk being placed farther away from the focal point, the light beams provided with astigmatism on the first and third quadrant regions of the transparent blaze hologram 48 are each incident as an optical spot in the shape of a line segment that extends in the direction of L2 on the light-receiving regions A2, D2. On the other hand, the light beams provided with astigmatism on the second and fourth quadrant regions of the transparent blaze hologram 48 are each incident as an optical spot in the shape of a line segment that extends in the direction of L1 across the light-receiving regions (B1, B2), (C1, C2). Therefore, with the optical disk being placed farther away from the focal point, the FES takes generally on a positive value from the aforementioned equation (11) since these line-segment-shaped optical spots have the same shape and size (area).

FIG. 27 is a view illustrating the state of a return light spot on the optical detector 19 when the optical disk is defocused being placed closer to the objective lens than to the focal point thereof. Consider the case where the optical disk is placed closer to the objective lens than to the focal point thereof. In this case, the light beams provided with astigmatism on the first and third quadrant regions of the transparent blaze hologram 48 are each incident as an optical spot in the shape of a line segment that extends in the direction of L1 across the light-receiving regions (A1, A2), (D1, D2). On the other hand, the light beams provided with astigmatism on the second and fourth quadrant regions of the transparent blaze hologram 48 are each incident as an optical spot in the shape of a line segment that extends in the direction of L2 on the light-receiving regions B2, C2. Therefore, with the optical disk being placed closer to the objective lens than to the focal point thereof, the FES takes generally on a negative value from the aforementioned equation (11) since these line-segment-shaped optical spots have the same shape and size (area).

Accordingly, the focusing servo control can be positively provided by means of electrical feedback signals with an inverted positive or negative sign of the focus error signal FES and through the control of an objective lens drive mechanism provided on an objective lens 7 of the optical pickup device 100 to make the value of FES zero.

On the other hand, other control electrical signals can be obtained in the same way as in the aforementioned embodiment.

Figure 28A:
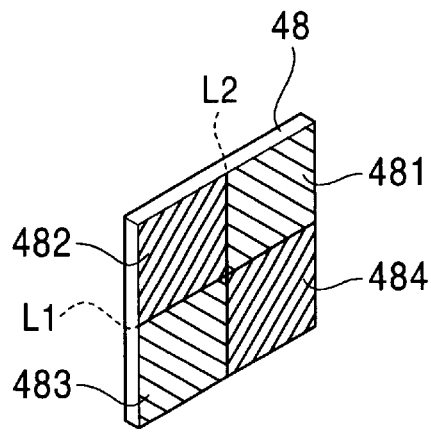
FIGS. 28A and 28B are explanatory perspective views of a transparent blaze hologram and an optics including four-cylindrical-lens assembly equivalent thereto to illustrate the action of the hologram element in an optical pickup according to an embodiment of the present invention.
Figure 28B:
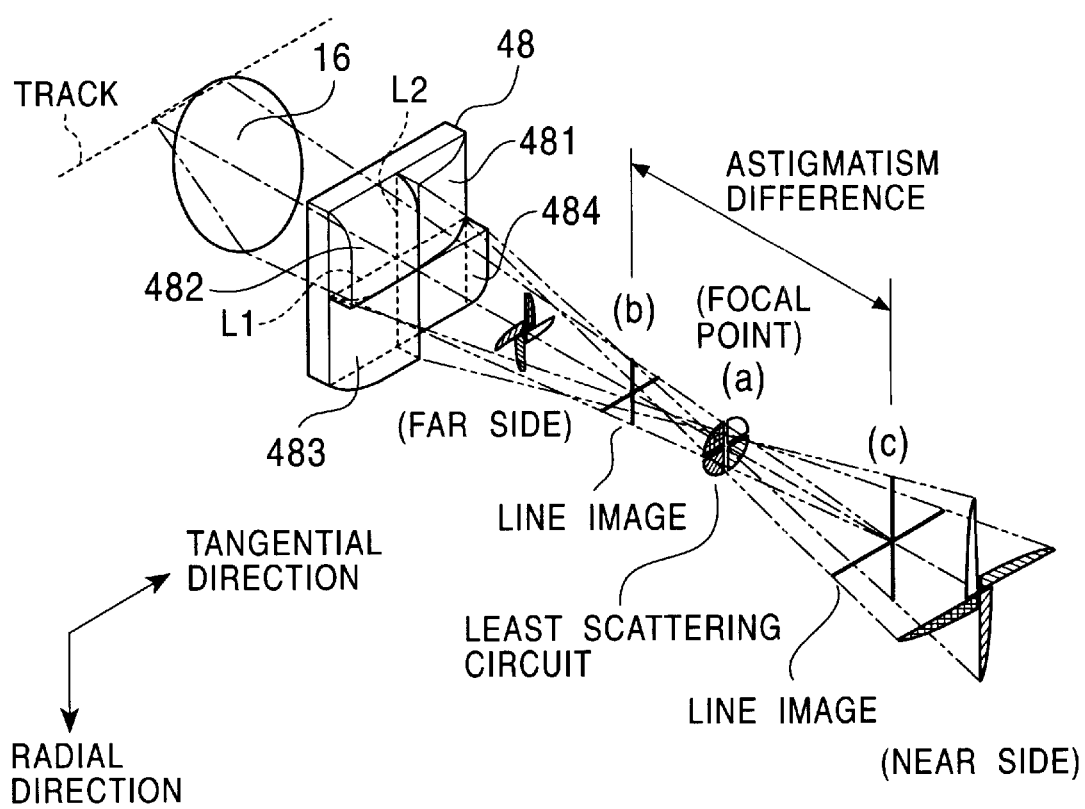

Referring now to FIGS. 28A and 28B, described in detail is the subdivision of the return light by the astigmatism of the transparent blaze hologram 48 including the four-way-splitting hologram portion.

In FIG. 28A, first to fourth four-way-splitting hologram portions 481, 482, 483, 484 of the transparent blaze hologram 48 have the action of the lens surfaces of cylindrical lenses. The four-way-splitting hologram portions 481–484 provide the return light passing through the adjacent quadrant regions on the same side across the parting line L1 or L2 with astigmatisms rotated by 90 degrees relative to each other and split the return light in four for each quadrant region. As shown in FIG. 28B of an optics including a four-cylindrical-lens assembly 48 equivalent to the transparent blaze hologram 48, the four-way-splitting hologram portions 481–484 correspond to the lens portions 481–484 of the cylindrical lenses. The first and third lens portions 481, 483, disposed in respective diagonal quadrants, include lens surfaces of the cylindrical lenses having a center axis that extends in the direction of extension of the parting line L2 (in the radial direction). The center axis is meant to be a straight line that is formed of a collection of the centers of radii of curvature of the cylindrical lenses. The second and fourth lens portions 482, 484, disposed in the other diagonal quadrants, include lens surfaces of the cylindrical lenses having a center axis that extends in the direction of extension of the parting line L1 (in the tangential direction). The center axis of lens portions disposed in one diagonal direction is rotated by 90 degrees around the optical axis relative to the lens portions disposed in the other diagonal direction. This arrangement provides the return light portion passing through diagonal quadrants with astigmatisms rotated by 90 degrees relative to each other. The first to fourth four-way-splitting hologram portion of the transparent blaze hologram 48 is formed by the two-light-wave interference method as the lens surface of a cylindrical lens.

In addition, as shown in FIG. 28B, the center axes of the first and third lens portions 481, 483 are aligned with each other in parallel to the parting line L2 on the plane that includes the optical axis of the return light and the parting line L2. On the other hand, the center axes of the second and fourth lens portions 482, 484 are at an angle of 90 degrees thereto. Such a cylindrical lens assembly can also be employed which has the center axes of the second and fourth lens portions 482, 484 which are each decentered in parallel from the parting line. In addition, it is thereby made possible to spatially separate the return light provided with astigmatism of the first and third lens portions 481, 483 from the return light provided with astigmatism of the second and fourth lens portions 482, 484 rotated by 90 degrees.

As shown in FIG. 28B, the optical component of the return light from the objective lens passing through the first lens portion 481 in the first quadrant region passes through the first quadrant region up to a first line image. After the first line image, the optical component travels to the second quadrant region and then to the third quadrant region after the subsequent line image. Accordingly, within an astigmatic difference, the optical component changes from the line image spot along the parting line L2 in the second quadrant region via a sector-shaped spot to a line image spot along the parting line L1 declined by 90 degrees. The optical component of the return light passing through the second lens portion 482 in the second quadrant region passes through the second quadrant region up to a first line image. The optical component travels to the third quadrant region after the first line image and then to the fourth quadrant region after the subsequent line image. Accordingly, within a capture range, the optical component changes from the line image spot along the parting line L1 in the third quadrant region via a sector-shaped spot to a line image spot along the parting line L2 declined by 90 degrees.

On the other hand, the optical component passing through the third lens portion 483, disposed at a diagonal position, in the third quadrant region passes through the third quadrant region up to a first line image. The optical component travels to the fourth quadrant region after the first line image and then to the first quadrant region after the subsequent line image. Accordingly, within a capture range, the optical component changes from the line image spot along the parting line L2 in the fourth quadrant region via a sector-shaped spot to a line image spot along the parting line L1 declined by 90 degrees. The optical component passing through the fourth lens portion 484 in the fourth quadrant region passes through the fourth quadrant region up to a first line image. The optical component travels to the first quadrant region after the first line image and then to the second quadrant region after the subsequent line image. Accordingly, within a capture range, the optical component changes from the line image spot along the parting line L1 in the first quadrant region via a sector-shaped spot to a line image spot along the parting line L2 declined by 90 degrees.

As described above, the four-way-splitting hologram portions 481, 482, 483, 484 having the lens surface action of cylindrical lenses and acting as the lens portions 481–484 split spatially the return light component passing therethrough for each quadrant region and provide the light with astigmatism. This makes it possible to simultaneously employ the three-beam method or the DPD method. Incidentally, the reflecting blaze hologram 38 according to the aforementioned third embodiment is the transparent blaze hologram 48 added by a reflecting function.

Incidentally, the aforementioned embodiment employs a four-way-split polarizing optical element which may be implemented by using a polarizing optical element split in two or more for separating the main beam return light in two or more.

The present invention is adapted that a polarizing optical element such as a prism surface or hologram is disposed where three beams can be spatially separated, and a photodetector is disposed downstream from the polarizing optical element. This can provide the main and side beams with optical effects different from each other. As an example of the effects, it is not necessary to provide the side beams, which are originally unnecessary for generating focus error signals, with optical actions for generating focus error signals (reflection, change in focal length, or addition of astigmatism). This makes it possible to reduce the number of optical beam spots on the detector. Consequently, the crosstalk between the main and side beams can be prevented, and the number of divisions of the detector can be made small. Furthermore, the polarizing optical element and the detector are integrated with each other, thereby making it possible to prevent deterioration in detection of focus error signals that would be otherwise caused by dislocation between the polarizing optical element and the detector.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

This application is based on a Japanese Patent Application No. 2000-298224 which is hereby incorporated by reference.

What is claimed is:

1. An optical pickup device comprising:
    an illuminating optical system for focusing a light beam, split in a main beam and at least one side beam, onto a track on an information storage surface of an optical storage medium to form optical spots thereon;
    a light detecting optical system for introducing return light reflected back from said information storage surface; and
    a polarizing optical element, having regions split at the center of an optical path by a parting line extending at least either in a direction of extension of said track or in a direction perpendicular to the direction of extension and splitting the main beam return light at least in two for each of said regions, on a plane perpendicular to the optical path of the return light of the reflected main beam in said light detecting optical system,
    wherein said polarizing optical element is disposed where the return light of the main and side beams is spatially separated, and
    said optical pickup device further comprises an optical detector disposed in contact with said polarizing optical element, said optical detector having a plurality of main-beam light-receiving elements for receiving the separated main beam return light and a plurality of side-beam light-receiving elements for receiving the separated side beam return light.

2. An optical pickup device according to claim 1, wherein said polarizing optical element comprises a parallel plate portion formed of an optically transparent material, and a split reflecting surface, formed on a side of light emission of said parallel plate portion, for reflecting return light in said split regions, and
    said main and side beam light-receiving elements are formed on the side of light emission of said parallel plate portion, and two or more main-beam light-receiving elements are disposed to allow said separated main beam return light to be reflected at a boundary surface on a side of light incidence of said parallel plate portion to reach said main-beam light-receiving element.

3. An optical pickup device according to claim 2, wherein said split reflecting surface is a pyramidal prism recessed surface having a ridge line corresponding to said parting line.

4. An optical pickup device according to claim 2, wherein said split reflecting surface is a roof type prism recessed surface having a ridge beam line corresponding to said one parting line and a step portion along said other parting line.

5. An optical pickup device according to claim 2, wherein said split reflecting surface is a hologram for reflecting light in different directions in said split regions.

6. An optical pickup device according to claim 5, further comprising:
    a three-way-split detector, disposed opposite to said split reflecting surface, having three light-receiving regions split by two parallel parting lines extending in a direction perpendicular to the direction of extension of said track, wherein each of said main-beam light-receiving elements comprises two light-receiving regions split by two-way-splitting parting lines extending generally in parallel to a direction perpendicular to the direction of extension of said track, said two-way-splitting parting line extends to where signals delivered by said two light-receiving regions derived from said return light spot when a light beam is focused on an optical storage medium are generally equal to each other, and a differential spot size method is employed to generate a focus error signal in accordance with an output of said three-way-split detector and said main-beam light-receiving elements, said focus error signal consists of the sum of differences between signals delivered from the two light-receiving regions of said main-beam light-receiving elements and the sum of differences between outputs from a light-receiving region sandwiched by two light-receiving regions of said three-way-split detector and from the sandwiching two light-receiving regions.

7. An optical pickup device according to claim 5, wherein said hologram splits said return light in two or more for each of said regions and has an optical function for providing said return light passing through said regions adjacent to each other on the same side split by said parting line with astigmatisms rotated by 90 degrees relative to each other around the optical path, and wherein each of said main-beam light-receiving elements comprises two light-receiving regions split by two-way-splitting parting lines extending generally in parallel to said parting line disposed in a direction perpendicular to the direction of extension of said track, and wherein said two-way-splitting parting line extends to where signals delivered by said two light-receiving regions of said light-receiving elements derived from said return light spot received on said light-receiving elements on an image plane where a light beam becomes circular in an optical system provided with astigmatism are generally equal to each other, and wherein a focus error signal is generated from the sum of differences between signals delivered from the two light-receiving regions of said light-receiving elements.

8. An optical pickup device according to claim 2, wherein said split reflecting surface is provided with a semitransparent film.

9. An optical pickup device according to claim 2, wherein tracking servo control is provided by a phase difference method for detecting a phase difference in each sum signal delivered from said main-beam light-receiving elements for receiving independently said return light having passed through said split regions.

10. An optical pickup device according to claim 2, wherein each of said side-beam light-receiving elements comprises two light-receiving regions spaced apart from each other and split in two along a parting line extending in the direction of extension of said track, and tracking servo control is provided by a differential push-pull method in accordance with a sum signal of differences between signals delivered from the two light-receiving regions of each of said side-beam light-receiving elements.

11. An optical pickup device according to claim 1, wherein said polarizing optical element comprises a parallel plate portion formed of an optically transparent material, and a four-way-splitting hologram, formed on a side of light incidence of said parallel plate portion, for splitting in four and transmitting return light in said split regions, said main and side beam light-receiving elements are formed on the side of light emission of said parallel plate portion, and four of said main-beam light-receiving elements for receiving the return light of said split main beam are disposed apart from each other in said split regions, said hologram splits said return light in four for each of said regions and has an optical function for providing said return light passing through said regions adjacent to each other on the same side split by said parting line with astigmatisms rotated by 90 degrees relative to each other around the optical path, each of said main-beam light-receiving elements comprises two light-receiving regions split by two-way-splitting parting lines extending generally in parallel to said parting line disposed in a direction perpendicular to the direction of extension of said track, when a light beam becomes circular in an optical system provided with astigmatism, said two-way-splitting parting line extends to where signals delivered by said two light-receiving regions of each of said main beam light-receiving elements derived from said return light spot received on said main beam light-receiving elements are generally equal to each other, and a focus error signal is generated from the sum of differences between signals delivered from the two light-receiving regions of each of said main beam light-receiving elements.

12. An optical pickup device according to claim 11, wherein said polarizing optical element comprises a two-way-splitting hologram, formed on the side of light incidence of said parallel plate portion, for splitting in two and transmitting return light of said side beam for each of said split regions split in two along a parting line extending in the direction of extension of said track.

* * * * *